(12) United States Patent
Egner

(10) Patent No.: US 7,292,418 B2
(45) Date of Patent: Nov. 6, 2007

(54) LEAKAGE CURRENT INTERRUPTER WITH SUSTAINED OVERVOLTAGE AND/OR OVERCURRENT PROTECTION

(75) Inventor: J. David Egner, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/832,412

(22) Filed: Apr. 27, 2004

(65) Prior Publication Data

US 2005/0237680 A1 Oct. 27, 2005

(51) Int. Cl.
*H02H 3/00* (2006.01)
(52) U.S. Cl. ...................................................... 361/42
(58) Field of Classification Search .................. 361/42
See application file for complete search history.

(56) References Cited

U.S. PATENT DOCUMENTS 5,926,355 A * 7/1999 Matsko et al. ................. 361/96
6,262,871 B1 7/2001 Nemir et al.
7,099,130 B2 * 8/2006 Angle et al. ................... 361/44
2005/0103613 A1 * 5/2005 Miller ........................ 200/400

* cited by examiner

*Primary Examiner*—Ronald W. Leja
(74) *Attorney, Agent, or Firm*—Birch, Stewart, Kolasch & Birch, LLP

(57) ABSTRACT

An appliance leakage current interrupter (ALCI) includes components for preventing sustained over-voltage and sustained over-current conditions. A current interruption threshold is inversely proportional to voltage supplied to the appliance. A microprocessor measures the voltage level of the incoming AC mains supply. The microprocessor is coupled to a sub-circuit for intentionally inducing a current mismatch between the two power lines monitored by the ALCI. Upon detecting an over-voltage of sufficient magnitude and duration, the microprocessor induces a current mismatch in the power lines, thereby causing the ALCI to interrupt power. A second current sensing transformer monitors one of the power lines. The microprocessor also receives the output of the second current sensing transformer. Upon detecting a current level exceeding a variable threshold, the microprocessor induces a current mismatch in the power lines and causes the ALCI to interrupt power.

34 Claims, 20 Drawing Sheets

LEAKAGE CURRENT INTERRUPTER WITH SUSTAINED OVERVOLTAGE AND/OR OVERCURRENT PROTECTION

FIELD OF THE INVENTION

This invention relates to power components in electronic devices. In particular, this invention relates to appliance leakage current interrupters (ALCIs), as well as to components for limiting the amount of voltage and/or current supplied to an electronic device.

BACKGROUND OF THE INVENTION

An appliance leakage current interrupter (ALCI), also known as a leakage current interrupter or a ground fault interrupter, is a known type of safety device used in numerous electrically powered appliances. As used throughout this specification (including claims), "appliance" includes electronic devices such as computers, gaming consoles, stereos, televisions, etc. Typically, an ALCI includes a sensor coil that surrounds the hot and neutral wires of the AC mains power supply lines to an appliance. If the current flowing in one line equals the current flowing out of the other line, the magnetic fluxes associated with the two currents will cancel each other out, and no voltage will be induced in the sensor coil. However, if the current flowing in one of the lines is less than the current in the other line (which is indicative of an undesirable grounding through a user or otherwise), the magnetic fluxes will be unequal. A voltage is thereby induced in the sensor coil. Upon detection of such a voltage above a predetermined level, a solenoid or other type of switch is activated (or "tripped") and a connection in one or both of the lines is broken.

ALCIs perform an important safety function, and are often required for various product certifications. However, there are many conditions under which an ALCI might not trip, but in which it would still be desirable to de-energize an appliance. For example, many electronic devices can only tolerate limited variations in the amount of voltage supplied to the device. Generally speaking, variations in a household voltage level will not trip an ALCI. To protect against such variations, it is usually necessary to provide a separate surge protector Although useful, surge protectors also have limitations. In particular, surge protectors are typically designed to prevent damage caused by short-term, high level increases in voltage (such as might be expected because of a lightning strike). However, longer term, lower magnitude voltage rises can also cause problems. Surge protectors do not always protect a device from voltage "swells," e.g., voltage increases of approximately 150% of normal that last for hundreds of milliseconds.

A related concern involves the amount of current drawn by an appliance or other device. Because power is equal to the product of current and voltage, a high current draw under higher input voltages may be problematic, but that same current draw under a lesser voltage may be allowable. Although current-limiting components are available, such components generally prevent current from exceeding a specific level, which level is not variable based on the voltage level. Using known components, it is necessary to assume the highest expected voltage level and limit current to a level that is lower than what might be tolerable under many conditions.

For these and other reasons, there remains a need for components to limit the amount of voltage and/or current supplied to an appliance. If these components could be combined with an ALCI, further advantages would be possible. For example, certain parts of the ALCI could also be used for the voltage and or current limitation functions, thereby reducing cost. Moreover, adding current and/or voltage limiting components to an ALCI would facilitate placing of multiple power control features in a compact package.

SUMMARY OF THE INVENTION

The present invention addresses the above and other challenges associated with supplying electric power to appliances. In a first embodiment, the invention includes a circuit for interrupting power to an appliance. The circuit has a current detector providing an imbalance signal (e.g., a voltage of a certain magnitude) when current through first and second power supply lines is unbalanced by more than a predetermined amount. The circuit also includes an interruption switch for interrupting current flow through at least one of the first and second supply lines. A ground fault detection sub-circuit is configured to open the interruption switch upon receipt of the imbalance signal. A fault-inducing switch connects the first and second supply lines and causes a current imbalance between the first and second supply lines when closed. The circuit further includes an over-voltage detection sub-circuit configured to receive a signal indicative of voltage supplied to the appliance, and further configured to close the fault-inducing switch when the supplied voltage exceeds a voltage threshold $V_{TRIP}$.

In a second embodiment, the invention includes a circuit for interrupting power to an appliance. The circuit has a current detector providing an imbalance signal when current through first and second power supply lines is unbalanced by more than a predetermined amount. The circuit also has at least one interruption switch for interrupting current flow through at least one of the first and second supply lines. A ground fault detection sub-circuit is configured to open the at least one interruption switch upon receipt of the imbalance signal. A fault-inducing switch connects the first and second supply lines and causes a current imbalance between the first and second supply lines when closed. The circuit further includes an over-current detection sub-circuit configured to receive a signal indicative of current supplied to the appliance, and further configured to close the fault-inducing switch when the supplied current exceeds a current threshold $A_{TRIP}$.

In a third embodiment, the invention includes a circuit for interrupting power to an appliance, and has an interruption switch for interrupting current flow through at least one of the first and second supply lines supplying power to an appliance. An over-voltage detection sub-circuit receives a signal indicative of voltage supplied to the appliance, and is configured to open the interruption switch when the supplied voltage exceeds a voltage threshold $V_{TRIP}$ for a period of time $t_{V\_TRIP}$. An over-current detection sub-circuit receives a signal indicative of current supplied to the appliance, and is configured to open the interruption switch when the supplied current exceeds a current threshold $A_{TRIP}$ for a period of time $t_{A\_TRIP}$.

These and other features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

In at least some embodiments of the invention, an appliance leakage current interrupter (ALCI) is combined with components for preventing a sustained over-voltage to the appliance. The ALCI is further combined with components that prevent a sustained over-current condition, and which interrupt power based on a current threshold that is inversely proportional to voltage level. In various embodiments, the ALCI includes a current sensing transformer for detecting an imbalance in the current flows of two wires supplying power to the appliance. The ALCI further includes a double-pole solenoid for interrupting power to those lines when a current imbalance is detected. Coupled to the ALCI is a microprocessor which measures the voltage level of the incoming AC mains supply. The microprocessor is further coupled to a sub-circuit for intentionally inducing a current mismatch between the two power lines monitored by the ALCI. Upon detecting an over-voltage of sufficient magnitude and duration, the microprocessor induces a current mismatch in the power lines, thereby causing the ALCI to interrupt power. A second current sensing transformer monitors one of the power lines and is also coupled to the microprocessor. Upon detecting a current level exceeding a variable threshold, the microprocessor induces a current mismatch in the power lines and causes the ALCI to interrupt power. Additional features of these and other embodiments are described below.

Figure 1:
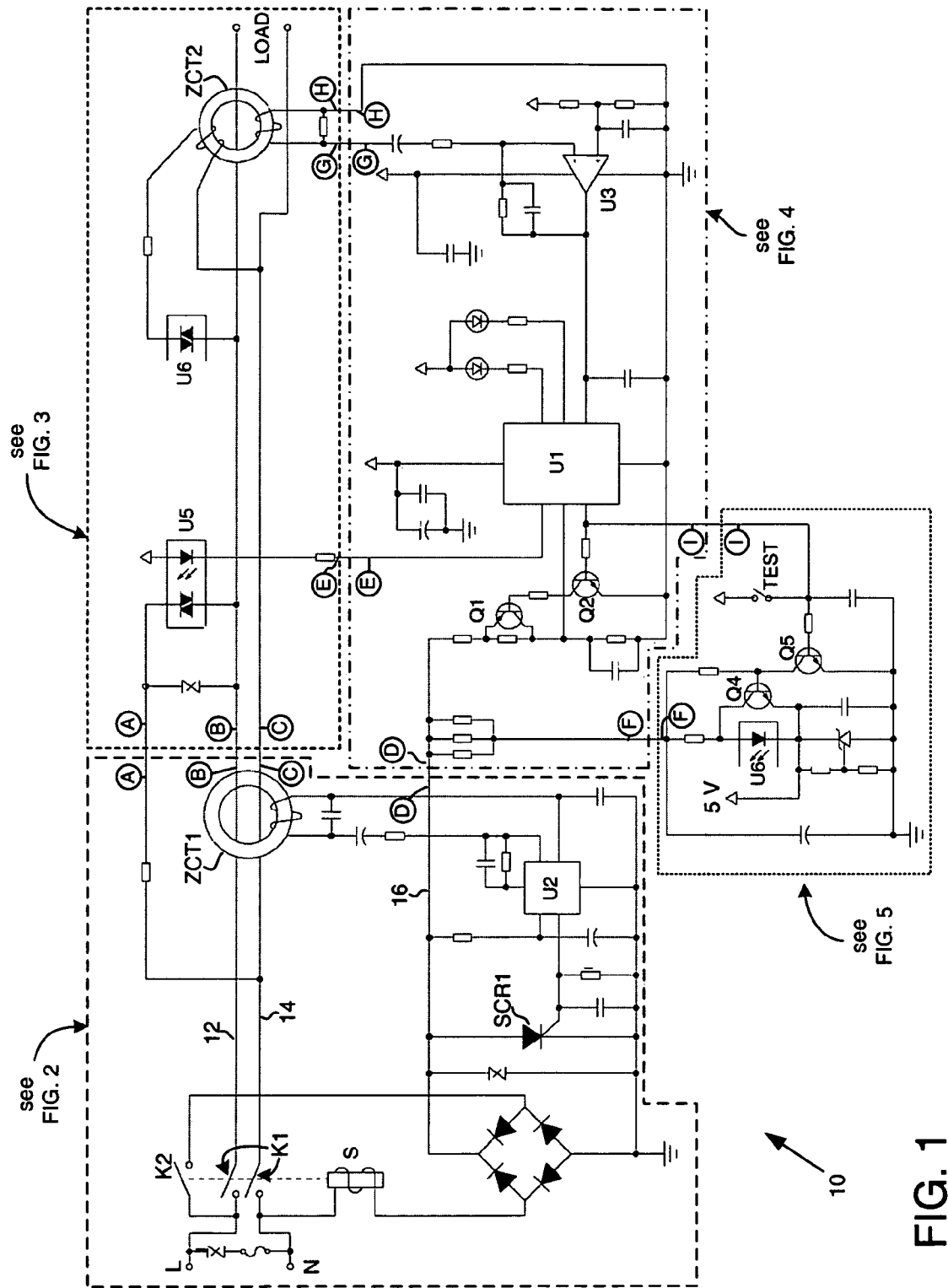
FIG. 1 is a schematic diagram for a circuit, according to at least some embodiments of the invention, for a combined appliance leakage current interrupter (ALCI), sustained over-voltage interrupter and sustained over-current interrupter.

FIG. 1 is a schematic diagram showing a circuit 10, according to at least some embodiments of the invention, for a combined ALCI, sustained over-voltage interrupter and sustained over-current interrupter. So as not to obscure FIG. 1, references are only provided for selected components. As shown in FIG. 1, however, the circuit is divided into four sections. One section is marked with a large-dash line and is enlarged in FIG. 2. Another section is marked with a small-dash line and is enlarged in FIG. 3. Similarly, the section marked with an uneven broken line is enlarged in FIG. 4, and the section marked with a dotted line is enlarged in FIG. 5. Electrical connections between each section are marked Ⓐ-Ⓐ through Ⓘ-Ⓘ in FIG. 1, and are correspondingly marked in FIGS. 2-5. Additional details are also provided in FIGS. 2-5 regarding the various components of circuit 10.

Referring first to FIG. 1, circuit 10 receives power at nodes L and N. In at least some embodiments, circuit 10 operates on standard U.S. household power (nominally 110 VAC, 60 Hz), with one of nodes L and N connected to the "hot" line and the other connected to the "neutral" line. Each of nodes L and N is connected to the line side of a double pole solenoid switch K1. From switch K1, lines 12 and 14 connect to the load, e.g., an appliance to which power is being supplied. Lines 12 and 14 pass through a first current sensing transformer ZCT1. Line 12 is connected, on the load side of current sensing transformer ZCT1 and through optically-coupled triac U5, to line 14 on the line side of ZCT1. Line 12 also passes, on the load side of ZCT1, through a second current sensing transformer ZCT2. Lines 12 and 14 are further connected on the line side of current sensing transformer ZCT2 by a second optically coupled triac U6, with the connection forming one winding of ZCT2. Another winding of ZCT2 is coupled to operational amplifier (op amp) U3, and is discussed below.

The output of the first current sensing transformer ZCT1 is provided to integrated circuit controller U2. In at least some embodiments, controller U2 is a low power ground fault interrupter controller available from Fairchild Semiconductor Corporation of South Portland, Me. and having part number RV4145A. Integrated circuit U2 measures the voltage output of ZCT1. As seen in FIG. 1 and in FIG. 2, an ALCI is formed by current sensing transformer ZCT1, controller U2, silicon controlled rectifier SCR1, solenoid S and switches K1 and K2. During normal operation, currents through lines 12 and 14 are equal, i.e., all current flowing to the load appliance through one of wires 12 and 14 returns through the other of lines 12 and 14. Because those currents flow in opposite directions, the magnetic fields associated with those current flows cancel each other, and no net voltage is induced in the winding of sensing transformer ZCT1. If the load appliance malfunctions (e.g., a frayed wire becomes exposed), if a user operates the appliance incorrectly (e.g., near water if the appliance is not designed for use in water), or in other circumstances, a portion of the current is diverted to ground and does not return through line 12 or line 14. This condition (known as a ground fault) causes the current in lines 12 and 14 to be unbalanced. As a result, the magnetic fields in lines 12 and 14 are no longer equal. This induces a voltage in the winding of ZCT1, which voltage is communicated to pins 1, 3 and 7 of controller U2.

Upon detecting a voltage from the ZCT1 winding indicating a current imbalance above a prescribed level (e.g., 6 milliamps root-mean-square ($mA_{RMS}$)), internal circuitry of controller U2 outputs a high voltage on pin 5 of U2. The high voltage on that pin then causes SCR1 to become conducting. When SCR1 conducts, current flows from the high side of the bridge formed by diodes D1 through D4 to the low side of that bridge (i.e., from the D1-D3 junction to the D2-D4 junction), thereby permitting current flow through the solenoid S and causing switches K1 and K2 to open. Metal oxide varistor M2 protects controller U2 from excessive voltage. Once opened, switches K1 and K2 must be manually reset by pressing a "reset" button. Although certain components in FIG. 2 (capacitors C1 through C6, resistors R1 through R4 and R23) are not described in detail, their purpose will be apparent to persons skilled in the art in light of other description contained herein.

When switches K1 and K2 are closed, a high voltage is supplied through diodes D1 and D3 to line 16 and controller U2. The high voltage on line 16 is further supplied, via transistor Q1, to pin 7 of microprocessor U1 (see FIG. 4). In at least some embodiments, microprocessor U1 is a programmable CMOS (complementary metal oxide semiconductor) 8-bit microcontroller having an analog-to-digital converter and EEPROM (electrically erasable programmable read only memory). In these embodiments, microprocessor U1 is "PIC12F675" device available from Microchip Technology Inc. of Chandler, Ariz. Microprocessor U1 periodically converts the voltage on pin 7 to a digital value using an internal analog-to-digital converter. Based on that digital value, microprocessor U1 determines whether an over-voltage condition exists. For example, a household power supply may typically provide power at 110 VAC, but may swell to 150 VAC because of unexpected fluctuations in the power grid. Various types of appliances (the load) can tolerate short term voltage rises of this magnitude, but may be damaged by such voltage levels lasting for several hundred milliseconds. Further details of over-voltage determinations and corresponding actions are provided below.

Figure 4:
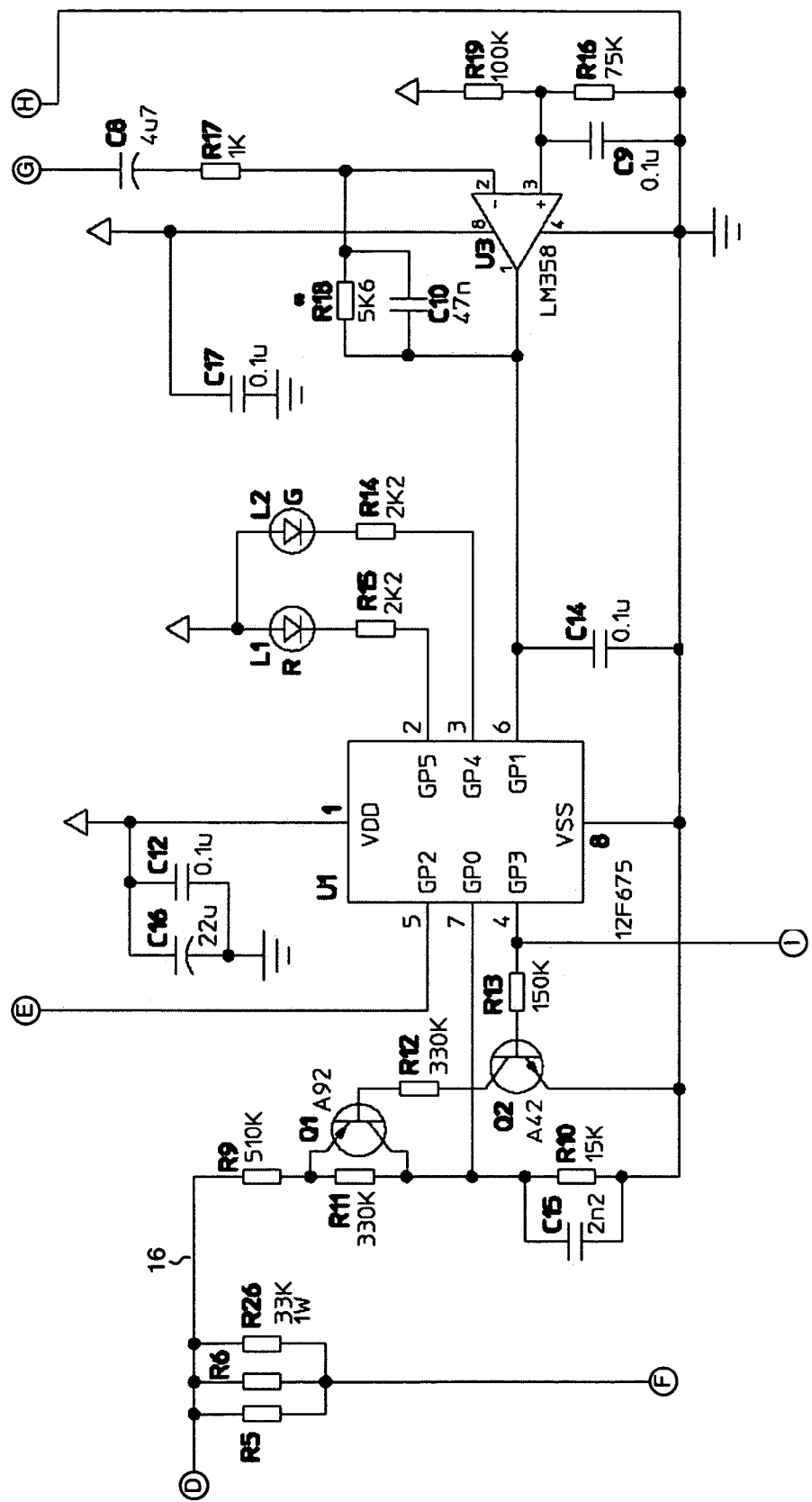
Figure 5:
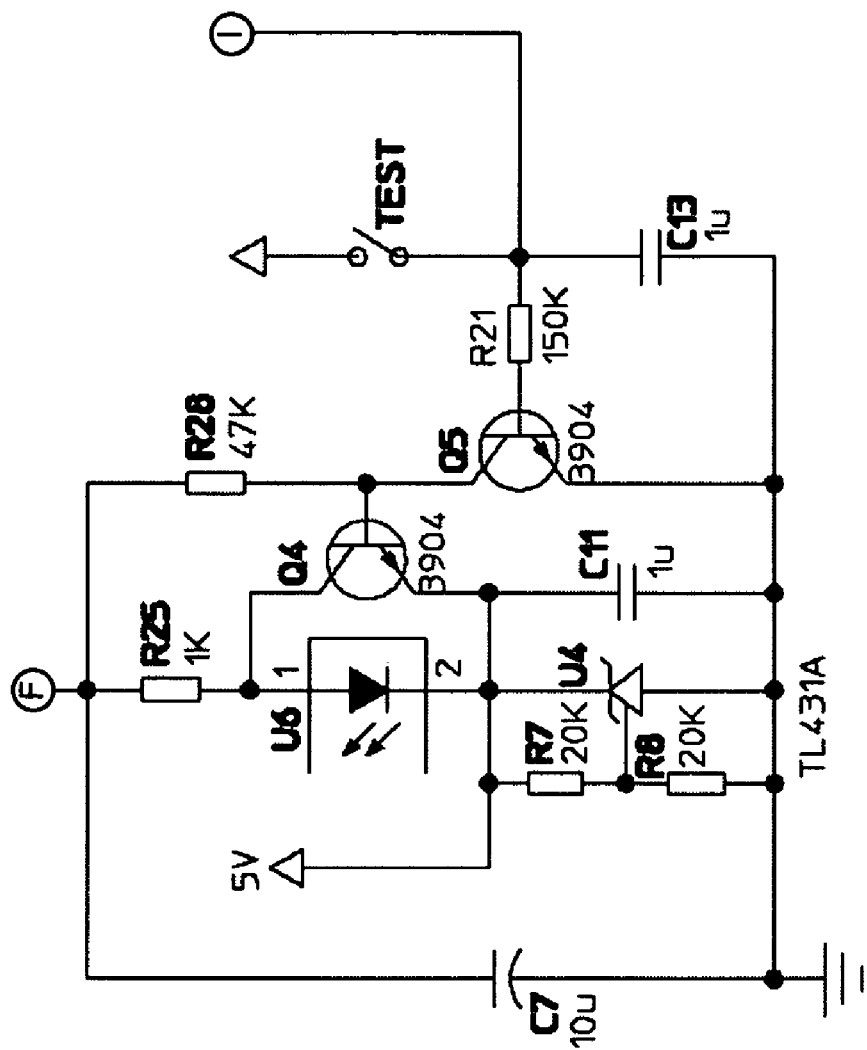

Voltage from line 16 is further supplied, via voltage-reducing resistors R5, R6 and R26 (see FIG. 4) to the sub-circuit of FIG. 5. The reduced voltage from line 16 is then applied to the high side of resistor R25. The low side of R25 is connected to the light-emitting diode (LED) of optically-coupled triac U6 and to the collector of transistor Q4. The low side of the U6 LED and the emitter of Q4 are connected to resistor R7 and shunt regulator U4. In some embodiments, shunt regulator U4 is a three terminal adjustable regulator having part number TL431A and available from Fairchild Semiconductor Corporation. Shunt regulator U4 and resistors R7 and R8 provide a 5 volt power supply for microprocessor U1 and other circuit components. The base of transistor Q4 is connected to the collector of transistor Q5, with the emitter of Q5 being connected to ground. When a TEST switch is closed, the 5 volt power supply is coupled to the base of Q5 and to pin 4 of microprocessor U1 (see FIG. 4). In this condition, current flows to ground through Q5, thereby dropping the voltage at the Q4 base. The current through Q4 is thereby diverted through the U6 LED, causing the LED to illuminate the triac of U6 (shown in FIG. 3). Further details regarding the operation of optically-coupled triac U6 are provided below. Although certain components in FIG. 5 (capacitors C7, C11 and C13, resistors R21 and R28) are not described in detail, their purpose will be apparent to persons skilled in the art in light of other description contained herein.

Referring to FIG. 4, the voltage of line 16 is applied, after reduction by resistors R9 and R11, to pin 7 of microprocessor U1. As previously indicated, microprocessor U1 is thereby able to measure the incoming voltage on lines 12 and 14. The high side of R11 is connected to the emitter of transistor Q1, and low side of R11 is connected to the collector of Q1. The base of Q1 is connected to the collector of transistor Q2 via resistor R12. The Q2 emitter is grounded, and the Q2 base is connected via resistor R13 to pin 4 of microprocessor U1 and to the low side of the TEST switch (see off-page connector ⓘ and corresponding off-page connector ⓘ in FIG. 5). When a voltage is applied to the base of transistor Q2, either by closing the TEST switch or by operation of microprocessor U1, base-emitter current (and thus, collector-emitter current) flows in transistor Q2. In turn, current bypasses resistor R11 through the emitter and collector of Q1, thereby increasing the voltage on pin 7 of microprocessor U1. Further details of this aspect of the operation of circuit 10 are provided below.

Figure 2:
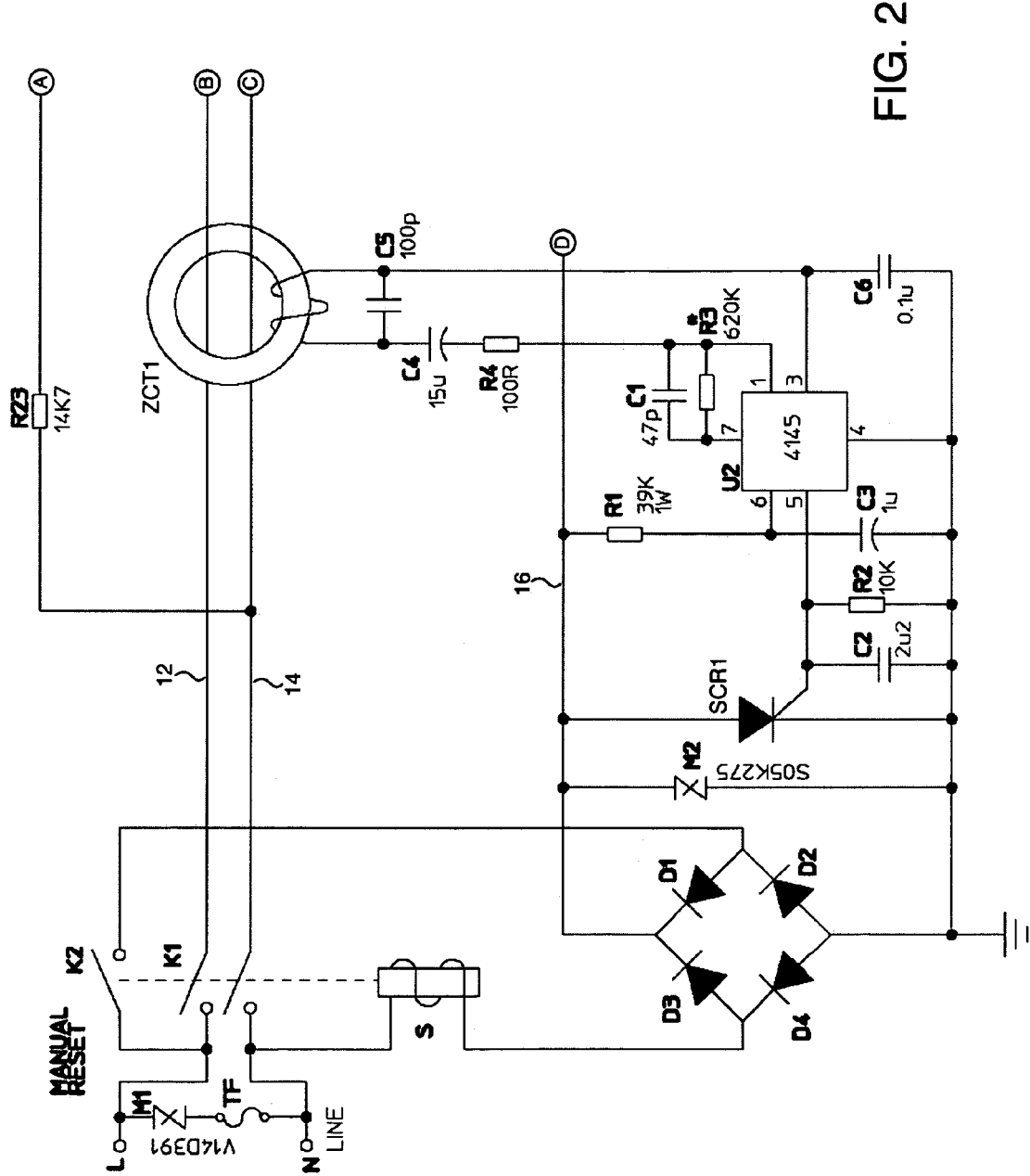
FIGS. 2-5 are enlarged portions of the schematic diagram of FIG. 1 showing additional details of various circuit components.
Figure 3:
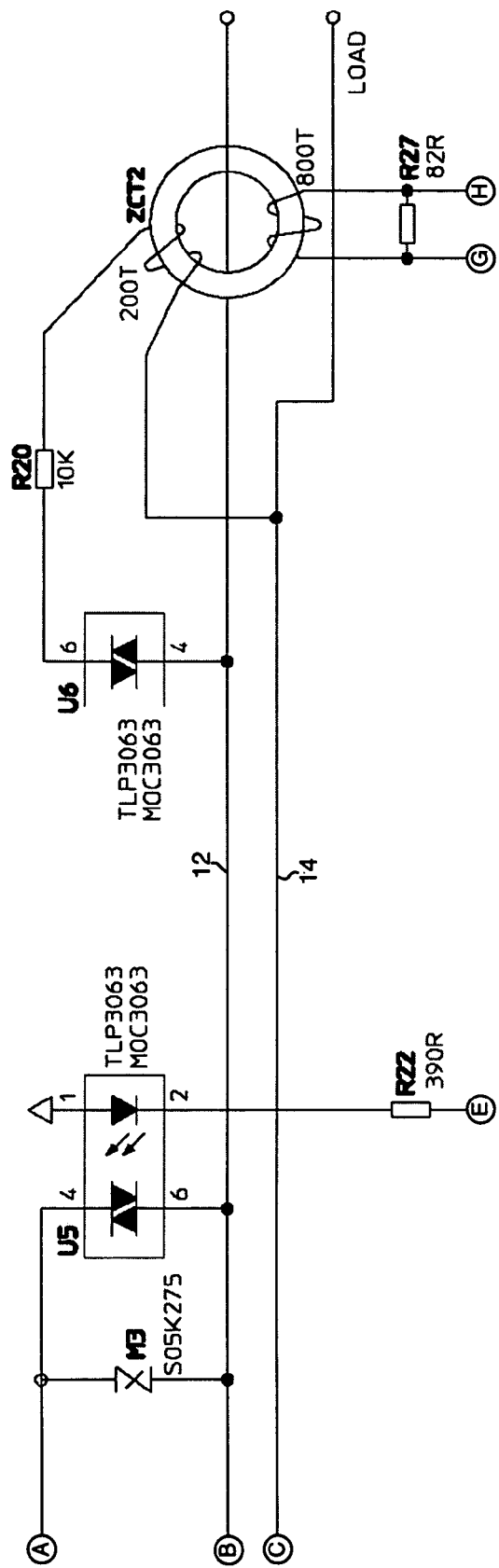

Pin 5 of microprocessor U1 is connected to the low side of the LED of optically-coupled triac U5 (see off-page connector Ⓔ in FIG. 4 and corresponding off-page connector Ⓔ in FIG. 3). The high side of that LED is connected to the 5 volt power supply described with regard to FIG. 5. When microprocessor U1 drives its pin 5 low and permits current to flow to ground through pin 5, the LED of U5 illuminates the triac of U5, thereby permitting current to flow from line 12 on the load side of ZCT1 to line 14 on the line side of ZCT1 (see FIGS. 2 and 3 and off-page connectors Ⓐ-Ⓐ). In this manner, microprocessor U1 can intentionally cause a mismatch between currents in lines 12 and 14, simulating a ground fault and causing the ALCI sub-circuit to open switches K1 and K2.

Returning to FIG. 4, pin 1 of microprocessor U1 is connected to the 5 volt power supply described in connection with FIG. 5, and pin 8 is connected to ground. Pins 2 and 3 are respectively connected, via resistors R15 and R14, to red LED L1 and green LED L2. By alternately driving pin 2 or pin 3 low and permitting current to flow to ground, microprocessor U1 selectively causes the red or green LED to glow. Microprocessor U1 causes green LED L2 to illuminate when circuit 10 is functioning properly, and causes red LED L1 to illuminate when circuit 10 is malfunctioning or being tested.

Pin 6 of microprocessor U1 receives, via op amp U3, a signal from current sensing transformer ZCT2. As shown in FIGS. 3 and 4, one side of one of the ZCT2 windings is connected to the inverting input of Op Amp U3 through capacitor C8 and resistor R17 (see off-page connector Ⓖ and corresponding off-page connector Ⓖ in FIG. 3). The other side of that ZCT2 winding is connected to ground (see off-page connector Ⓗ and corresponding off-page connector Ⓗ in FIG. 3). The non-inverting input of op amp U3 is connected to the 5 volt power supply (see FIG. 5) through a voltage divider formed by resistors R19 and R16, and to ground through capacitor C9. A feedback loop (having resistor R18 and capacitor C10) connects the inverting input of U3 with the U3 output. As current flows through ZCT2, a voltage is generated in the winding of ZCT2 coupled to op amp U3. This voltage, after filtering and amplification by op amp U3 and other components in FIG. 4, is provided to pin 6 of microprocessor U1. Microprocessor U1 periodically converts the voltage on pin 6 to a digital value using its internal analog-to-digital converter. Based on that digital value, microprocessor U1 determines the amount of current flowing to the load. Based on the amount of voltage applied to the load by lines 12 and 14, which voltage is calculated from the voltage at pin 7 of microprocessor U1 (as described above), the microprocessor then determines whether an over-current condition exists. For example, the load appliance may typically draw 1.30 A, but occasionally draw as much as 1.50 A or more. Under normal household power supply conditions (e.g., 110 VAC), rises in current draw of such magnitude may not present a problem. However, if line voltage increases above normal because of unexpected fluctuations in the power grid, and if that voltage increase occurs during a period of high current draw and lasts for a sufficiently long time, the appliance may be damaged. Further details of over-current determinations and corresponding actions are provided below. Certain components in FIG. 4

(capacitors C12 and C14 through C17, resistor R10, the trimming pins of op amp U3) are not described in detail, as their purpose will be apparent to persons skilled in the art in light of other description contained herein.

As previously discussed, the LED of triac U6 (see FIG. 5) is actuated by the TEST switch or by microprocessor U1. Referring to FIG. 3, the triac portion of U6 connects lines 12 and 14 (through resistor R20) on the line side of ZCT2 through a separate winding of ZCT2. When the U6 LED activates and causes the U6 triac to conduct, current flows through the separate winding of ZCT2. The current flow through that winding induces a magnetic flux in the core of ZCT2 similar to that which would be induced by an abnormally high current in line 12, thereby increasing the voltage in the ZCT2 winding coupled to op amp U3. In this manner, a simulated over-current condition can be simulated by activating the U6 LED. As with FIGS. 2, 4 and 5, certain components in FIG. 3 (resistors R22 and R27, metal oxide varistor M3) are not described in detail, as their purpose will be apparent to persons skilled in the art in light of other description contained herein.

In at least some embodiments, microprocessor U1 is programmed to monitor the voltage on lines 12 and 14 and interrupt power in the event of a sufficiently long duration voltage swell. In particular, if the input voltage on lines 12 and 14 exceeds a voltage trip threshold ($V_{TRIP}$) for a trip time ($t_{V\_TRIP}$), microprocessor U1 allows current to flow to ground through pin 5. As previously described, this causes the LED of optically-coupled triac U5 to illuminate, allowing current to flow from line 12 to line 14 and create a simulated ground fault. Upon sensing the current imbalance, controller U2 applies a voltage on its pin 5, thereby causing SCR1 to conduct and switches K1 and K2 to open. The power to circuit 10 then remains interrupted until the user manually resets switches K1 and K2 by pressing a "reset" button. In at least one embodiment designed for operation with an input line voltage between 102 volts RMS ($V_{RMS}$) and 132 $V_{RMS}$, a frequency of 57 to 63 Hz and a maximum load current of 1.70 amps RMS ($A_{RMS}$), $V_{TRIP}$ has a value between 135 $V_{RMS}$ and 155 $V_{RMS}$, and $t_{V\_TRIP}$ has a value between 525 milliseconds (ms) and 675 ms. In that embodiment, $V_{TRIP}$ and $t_{V\_TRIP}$ are expressed as ranges so as to account for differences among individual circuits because of variations in individual circuit components and other manufacturing tolerances. For example, one circuit 10 might interrupt power if the voltage on lines 12 and 14 exceeds 135 $V_{RMS}$ for 525 ms, while another circuit 10 might allow a line voltage of 155 $V_{RMS}$ for 675 ms before interrupting power. The values for $V_{TRIP}$ and $t_{V\_TRIP}$, as well as the tolerances described, are merely examples. Other values for some or all of these parameters can be used in other embodiments (e.g., values for $t_{V\_TRIP}$ of at least 300 ms, of at least 400 ms, of at least 500 ms; $t_{V\_TRIP}$ between 525 ms and 650 ms; etc.).

In various embodiments, microprocessor U1 is further programmed to interrupt power if an over-current condition occurs. If the load current exceeds a current trip threshold ($A_{TRIP}$) for a trip time ($t_{A\_TRIP}$), microprocessor U1 allows current to flow to ground through pin 5 and creates a simulated ground fault, which ultimately causes switches K1 and K2 to open. In some embodiments, the current trip threshold $A_{TRIP}$ is inversely proportional to the input voltage on lines 12 and 14. In other words, for lower input voltages, the current trip threshold is higher. For higher input voltages, the current trip threshold is lower. For at least one embodiment designed for operation with an input line voltage between 102 $V_{RMS}$ and 132 $V_{RMS}$, a frequency of 57 to 63 Hz and a maximum load current of 1.70 $A_{RMS}$, $t_{A\_TRIP}$ is between 100 milliseconds and 250 milliseconds, and $A_{TRIP}$ varies linearly between the points in Table 1.

TABLE 1

| $A_{TRIP}$, $A_{RMS}$ (+/− tolerance, mA$_{RMS}$) | Input Voltage, $V_{RMS}$ |
|---|---|
| 1.75 A$_{RMS}$ (+/−50 mA$_{RMS}$) | 102 V$_{RMS}$ |
| 1.55 A$_{RMS}$ (+/−50 mA$_{RMS}$) | 117 V$_{RMS}$ |
| 1.35 A$_{RMS}$ (+/−50 mA$_{RMS}$) | 132 V$_{RMS}$ |

The tolerances in the first column of Table 1 account for differences among individual circuits because of variations in individual circuit components and other manufacturing tolerances. Similarly, the trip time $t_{A\_TRIP}$ varies between 100 milliseconds and 250 milliseconds. For example, one circuit 10 might interrupt power if load current exceeds 1.50 $A_{RMS}$ at 117 $V_{RMS}$ for 100 ms, while another circuit 10 might allow load current of 1.60 $A_{RMS}$ at 117 $V_{RMS}$ for 250 ms before interrupting power. Other values for some or all of these parameters can be used in other embodiments (e.g., values for $t_{A\_TRIP}$ of at least 125 ms, of at least 150 ms, of at least 200 ms, etc.).

Figure 6:
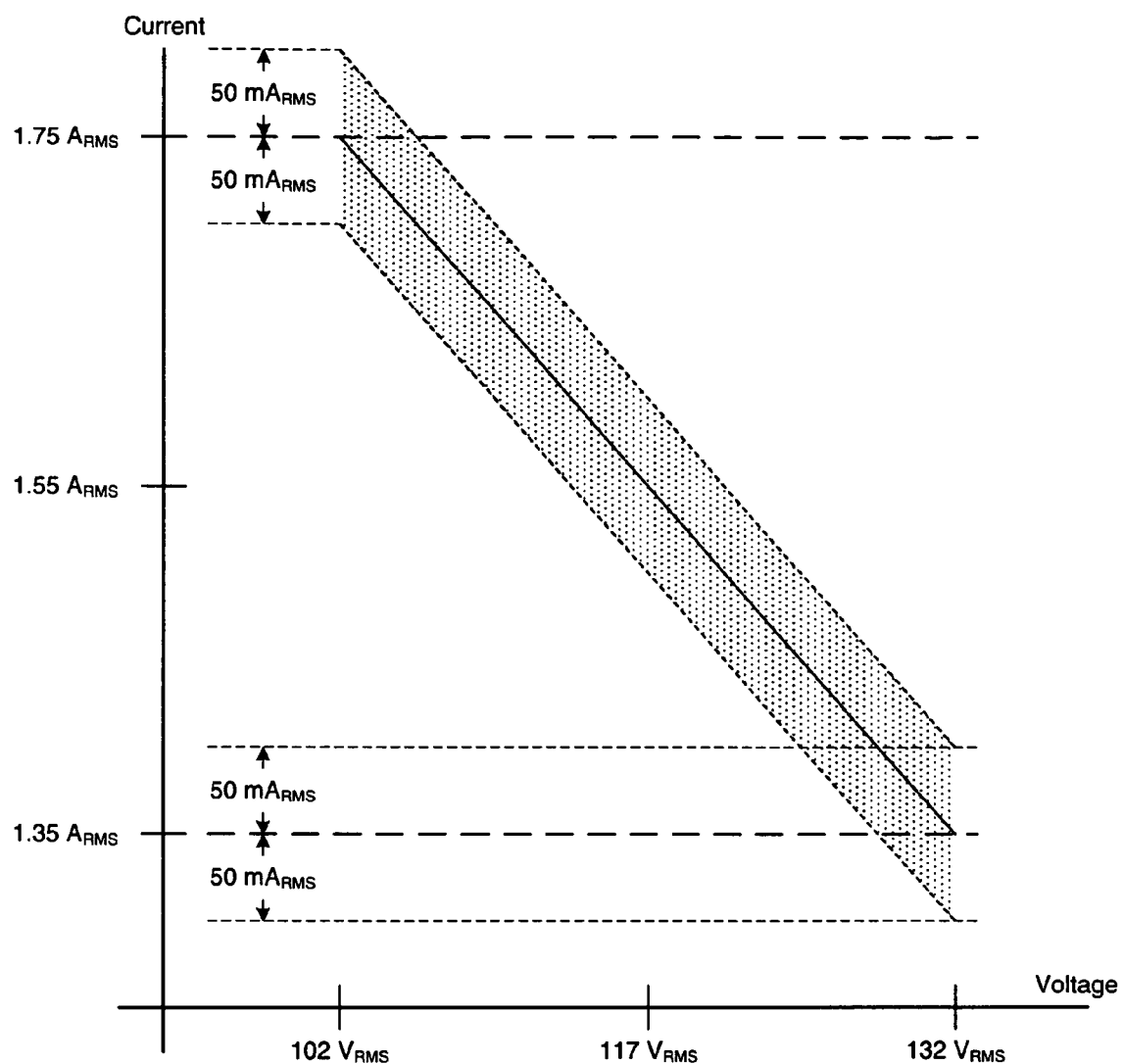
FIG. 6 is a graph illustrating, according to at least some embodiments of the invention, a current trip threshold that is inversely proportional to voltage.

FIG. 6 shows current trip threshold as a function of input voltage, according to at least some embodiments, for input voltages between 102 $V_{RMS}$ and 132 $V_{RMS}$. The solid line is the ideal current trip threshold, and the dashed lines represent a +/−50 mA$_{RMS}$ tolerance. Power is not interrupted for current/voltage combinations below the lower dashed line, regardless of duration. Any current/voltage combination above the upper dashed line lasting for longer than $t_{A\_TRIP}$ will cause a power interruption. A current/voltage combination between the two dashed lines exceeding $t_{A\_TRIP}$ may or may not result in power interruption, depending on tolerances within an individual circuit 10.

In another embodiment designed for operation with an input line voltage between 102 $V_{RMS}$ and 132 $V_{RMS}$, a frequency of 57 to 63 Hz and a maximum load current of 1.70 $A_{RMS}$, $t_{A\_TRIP}$ is between 125 milliseconds and 250 milliseconds, and $A_{TRIP}$ varies linearly between the points in Table 2.

TABLE 2

| $A_{TRIP}$, $A_{RMS}$ (+/− tolerance, mA$_{RMS}$) | Input Voltage, $V_{RMS}$ |
|---|---|
| 1.71 A$_{RMS}$ (+/−25 mA$_{RMS}$) | 102 V$_{RMS}$ |
| 1.56 A$_{RMS}$ (+/−25 mA$_{RMS}$) | 117 V$_{RMS}$ |
| 1.42 A$_{RMS}$ (+/−25 mA$_{RMS}$) | 132 V$_{RMS}$ |

In various embodiments, microprocessor U1 is further configured to test the over-voltage detection function, the over-current detection function and the ground fault interrupt function when the user presses the TEST key. When the user presses the TEST key, and as described above, the LED for optically-coupled triac U6 illuminates, thereby causing a current to flow through one of the windings of ZCT2. That current creates a magnetic flux in the core of ZCT2, generating a voltage in the other winding of ZCT2. This voltage is similar to that which would result from a current above the current trip threshold ($A_{TRIP}$), thereby simulating an over-current condition. As also described above, pressing the TEST key also results in emitter-collector current flow through transistor Q1, bypassing resistor R11 and increasing voltage at pin 7 of microprocessor U1. This increased voltage at pin 7 simulates an over-voltage condition, i.e., a voltage above the voltage trip threshold $V_{TRIP}$.

Pressing the TEST key also causes a higher voltage at pin 4 of microprocessor U1, thereby signaling to microprocessor U1 that the user has initiated a test. Upon detecting a higher pin 4 voltage, microprocessor U1 first determines the voltage level (from pin 7). If that voltage does not correspond to an over-voltage condition, the over-voltage detection portion of circuit 10 is not working properly, and a fault is reported (as described more fully below). If that voltage does correspond to an over-voltage condition, the test continues. Microprocessor U1 then determines the current level (based on the voltage at pin 6). If that current level does not correspond to an over-current condition, the over-current detection portion of circuit 10 is not working properly, and a fault is reported (as described below). If the current level does correspond to an over-current condition, microprocessor U1 tests the ALCI portion of circuit 10 by energizing the LED of optically-coupled triac U5. If the ALCI portion of the circuit does not function properly, power will not be interrupted, and the malfunction is reported (as described below). If the ALCI portion of the circuit does work properly, power to the circuit will be interrupted, and a manual reset button corresponding to switches K1 and K2 will physically (and audibly) change position. Upon hearing, seeing or feeling that position change, the user knows the circuit has passed the test.

Figure 7:
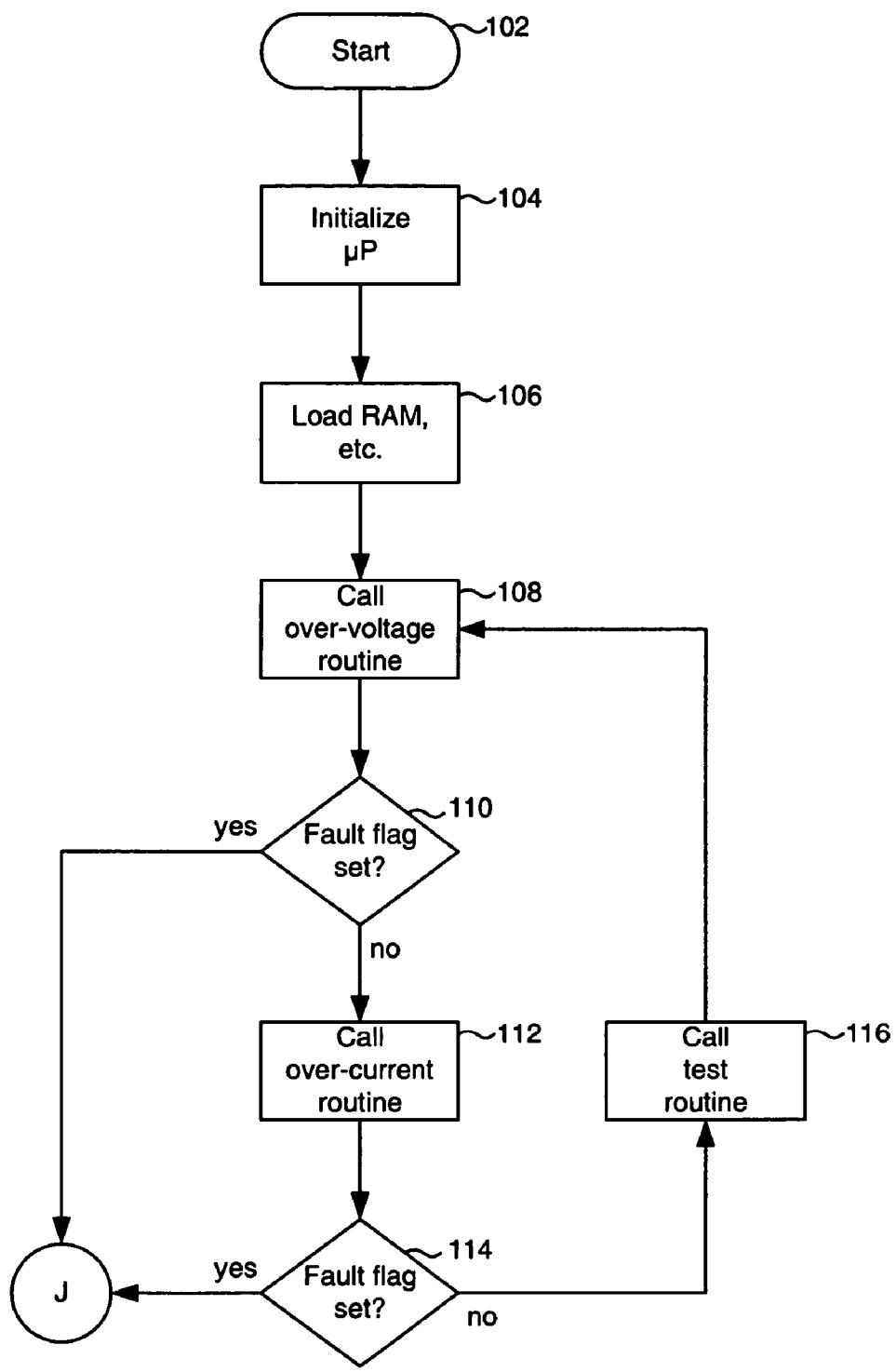
FIG. 7 is a flow chart for the operation, according to at least some embodiments of the invention, of a microprocessor for the circuit of FIGS. 1-5.

FIGS. 7 through 12 are flow charts, according to at least some embodiments of the invention, for the operation of microprocessor U1 of circuit 10. Referring to FIG. 7, start block 102 corresponds to initial activation of circuit 10. In at least some embodiments, this occurs when an appliance equipped with the circuit of FIG. 1 is initially plugged into a wall outlet, or when the "reset" button is pressed after the appliance has been plugged into an outlet. At block 104, microprocessor U1 performs various initialization steps. At block 106, the random access memory (RAM) of microprocessor U1 is loaded with programming instructions. In at least some embodiments, microprocessor U1 includes a non-volatile memory component such as EEPROM, and instructions are transferred from EEPROM into RAM. Various other steps may also be performed at block 106 such as a self-test, activating green LED L2 (FIG. 4), etc.

Figure 8:
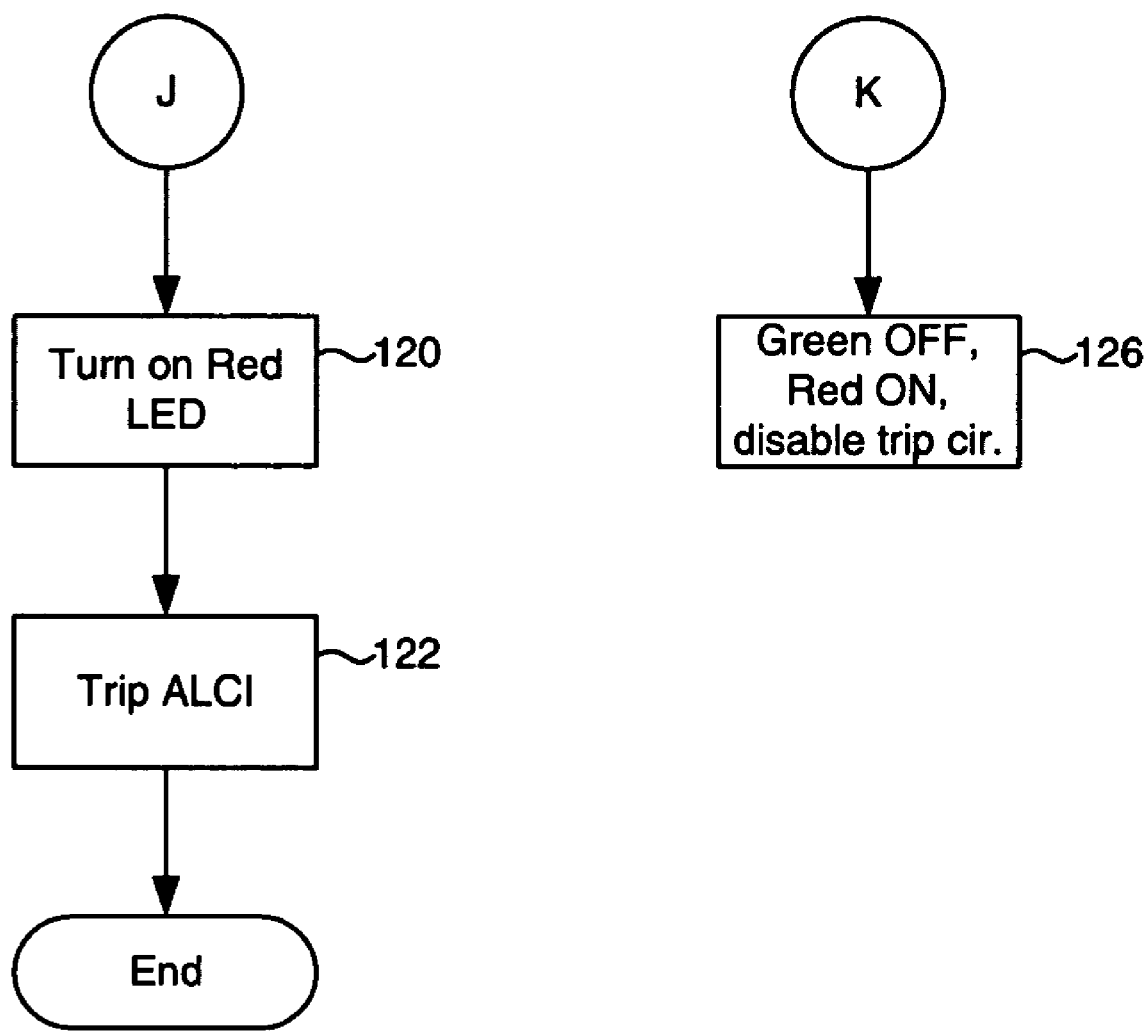
FIGS. 8-12 are additional flow charts for the operation, according to at least some embodiments of the invention, of a microprocessor for the circuit of FIGS. 1-5.
Figure 9:
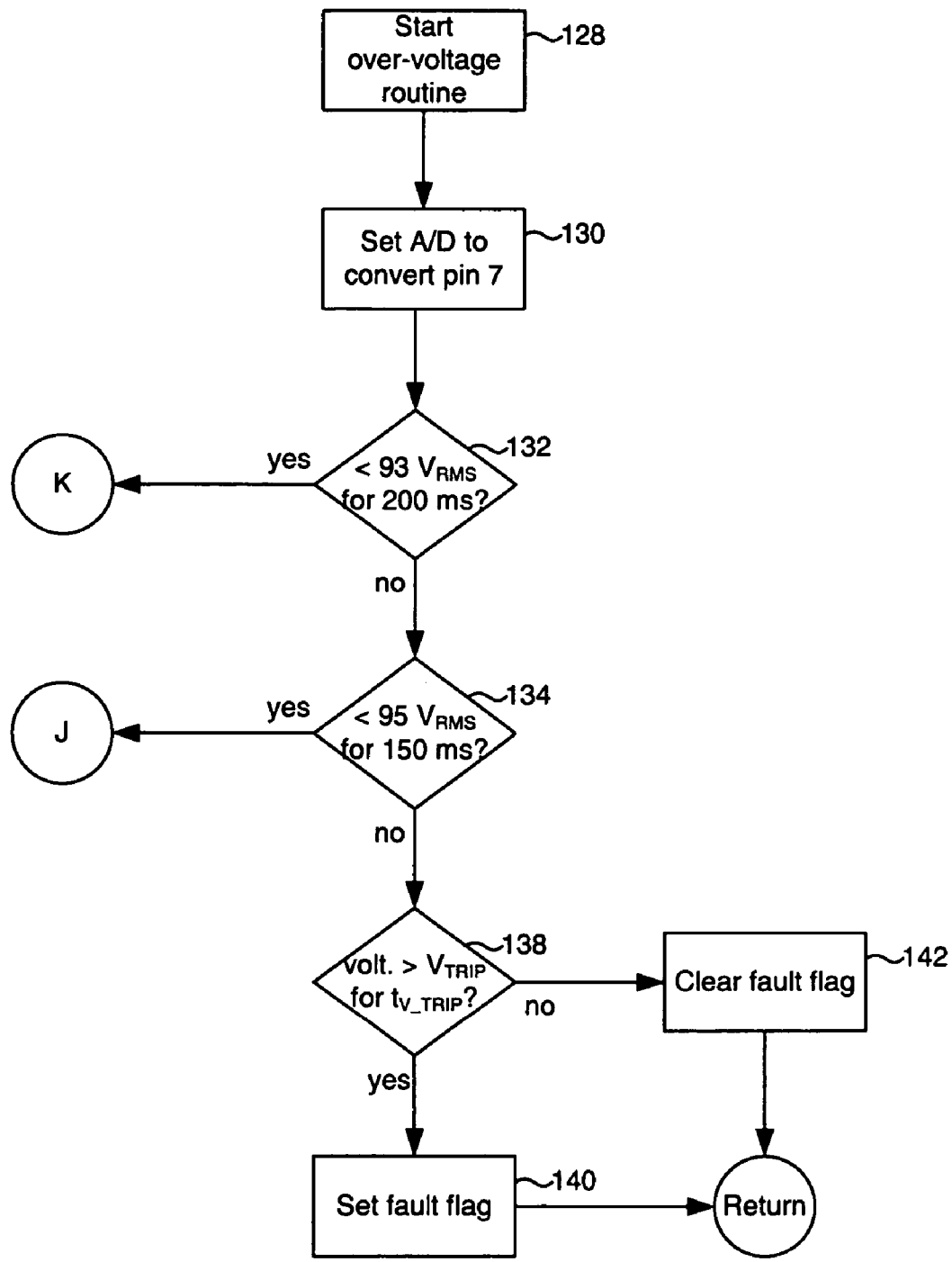

At block 108, microprocessor U1 initiates a call to a routine for determining whether an over-voltage condition exists. FIG. 9 is a flow chart showing steps of the over-voltage determination routine. After starting the routine at block 128, microprocessor U1 proceeds to block 130 and configures an internal analog-to-digital converter to convert the voltage at pin 7 to a digital value. At block 132, microprocessor U1 uses a series of digital values for the pin 7 voltage to calculate a root-mean-square (RMS) voltage over a period of 200 ms. As can be appreciated from FIGS. 1-5 and the accompanying description, the voltage at pin 7 will not be the same as the voltage between lines 12 and 14. However, the voltage at pin 7 will vary based on the line 12 to line 14 voltage, and the voltage to the load can thus be determined from pin 7. At block 132, microprocessor U1 first determines if the RMS voltage to the load is below a certain minimum value. In the example, microprocessor U1 determines if the RMS voltage is below 93 $V_{RMS}$ for more than 200 ms. In addition to abnormally high voltages, certain appliances can be damaged by abnormally low voltages, or will not function properly. Moreover, solenoid S in some embodiments may be damaged if less than a minimum voltage level is applied during an attempt to trip switches K1 and K2. Accordingly, the ALCI of circuit 10 should not be tripped under such conditions. However, the user should still be notified of the abnormally-low voltage. If the voltage is less than 93 $V_{RMS}$ for over 200 ms at block 132, microprocessor U1 proceeds, via the "yes" branch and off-page connector K, to block 126 (FIG. 8). At block 126, microprocessor U1 deactivates green LED L2, activates red LED L1 with a flashing rate of approximately 1 Hz, and does not trip the ALCI (i.e., does not illuminate the LED of optically-coupled triac U5). In this manner, the user is alerted that an abnormally low-voltage condition has occurred, and that the user should not attempt to use the appliance and/or should temporarily disconnect the appliance from a power outlet. While in block 126, microprocessor U1 periodically tests the input voltage. If the voltage rises above 97 $V_{RMS}$ for a minimum amount of time (e.g., 150 ms), microprocessor U1 performs a powering-on self-test, and then (assuming the test is passed) resumes normal operation of circuit 10. If the input voltage rises above 93 $V_{RMS}$ but does not reach 97 $V_{RMS}$, microprocessor U1 performs a self-test and then interrupts power to the circuit (by causing a current mismatch between lines 12 and 14 and tripping the ALCI).

Returning to FIG. 9, if the voltage is not less than the minimum specified in block 132, microprocessor U1 proceeds on the "no" branch to block 134. At block 134, microprocessor U1 again uses a series of digital values for the pin 7 voltage to calculate a root-mean-square (RMS) voltage, but over a period of 150 ms. Microprocessor U1 then determines if the line voltage is less then a certain level needed for proper operation of the appliance. In the example, microprocessor U1 determines if the line voltage is less than 95 $V_{RMS}$ for over 150 ms, but above the level needed for proper operation of solenoid S. If the line voltage is between these two levels, microprocessor U1 proceeds along the "yes" branch and off-page connector J to block 120 (FIG. 8). At block 120, microprocessor energizes red LED L1 and also energizes the LED of optically-coupled triac U5, thereby causing a current imbalance in lines 12 and 14. If controller U2 and other ALCI sub-circuit components function properly, the voltage imbalance is detected and SCR1 is made conducting, thereby energizing solenoid S and tripping switches K1 and K2. In the event of a successful trip of switches K1 and K2, power to circuit 10 is interrupted, and the algorithm terminates. If the ALCI malfunctions and switches K1 and K2 do not trip, power to circuit 10 will not be interrupted. Power will continue to be supplied to microprocessor U1, and red LED L1 will continue to illuminate, indicating a malfunction has occurred.

Returning again to FIG. 9, if the line voltage is above the minimum established in block 134, microprocessor U1 follows the "no" branch to block 138. At block 138, microprocessor U1 again uses a series of digital values for the pin 7 voltage to calculate a root-mean-square (RMS) voltage, but for a period $t_{V\_TRIP}$. If the line voltage value is above $V_{TRIP}$ for $t_{V\_TRIP}$, microprocessor U1 sets a fault flag at block 140, and then returns to the main program (FIG. 7). If not, microprocessor U1 clears the fault flag at block 142, and then returns to the main program. Upon returning to the main program (FIG. 7), microprocessor U1 determines at block 110 if the fault flag has been set. If so, microprocessor U1 proceeds on the "yes" branch and off-page connector J to block 120 (FIG. 8) and follows the step(s) previously described. If the fault flag is not set, microprocessor U1 proceeds on the "no" branch from block 110 to block 112, where an over-current determination routine is called.

Figure 10:
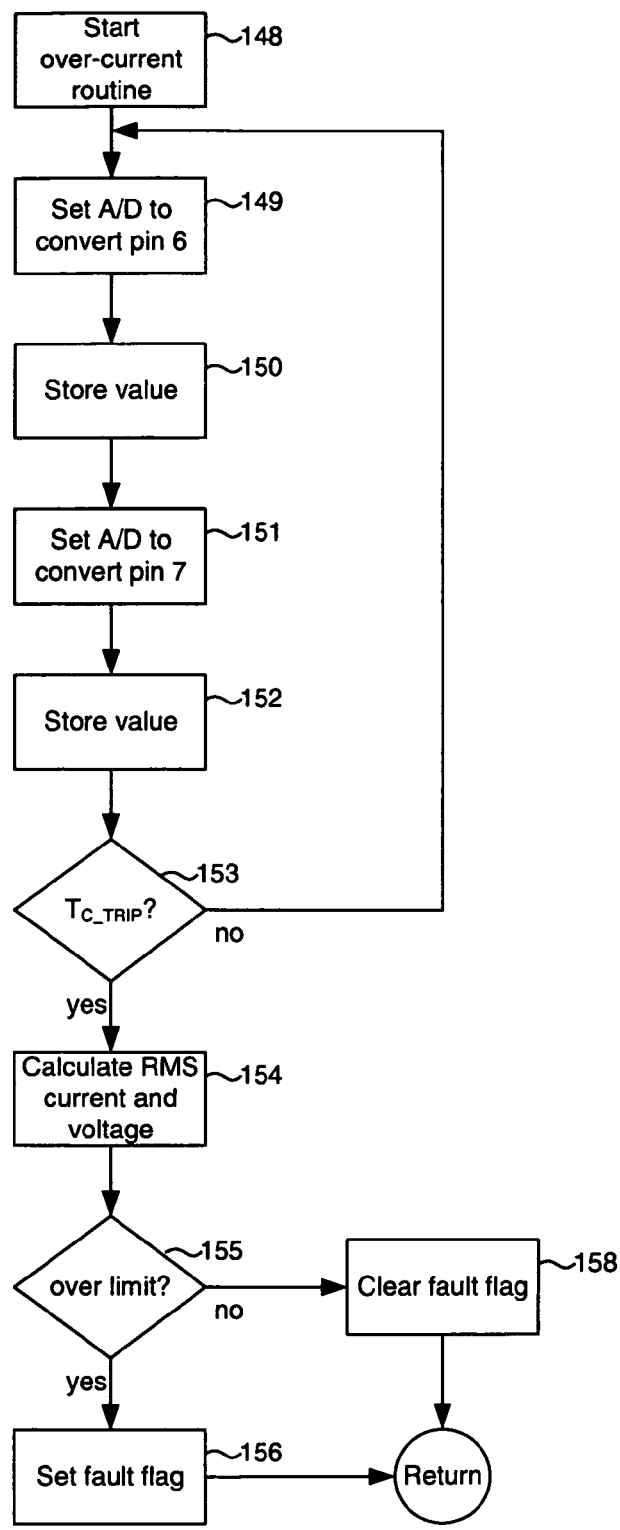

FIG. 10 is a flow chart showing steps of the over-current determination routine. After starting the routine at block 148, microprocessor U1 proceeds to block 149 and configures an internal analog-to-digital converter to convert the voltage at U1 pin 6 to a digital value. At block 150, microprocessor U1 stores the digital value for the pin 6 voltage (which is indicative of the current through line 12) and proceeds to block 151. At block 151, microprocessor U1 configures the internal analog-to-digital converter to convert the voltage at pin 7 to a digital value. At block 152, microprocessor U1 stores the digital value for the pin 7 voltage (which is indicative of the voltage on lines 12 and 14) and proceeds to block 153. At block 153, microprocessor U1 determines whether the period $t_{C\_TRIP}$ (e.g., $t_{A\_TRIP}$ discussed above) has elapsed since block 148. If no, microprocessor U1 repeats steps 149 through 152, and stores additional values indicative of the voltage and current supplied to the load. Microprocessor U1 continues repeating steps 149 through 152 for a time $t_{C\_TRIP}$, and then proceeds (via the "yes" branch of block 153) to block 154. At block 154, microprocessor U1 uses the values stored during iterations of steps 149 through 153 to calculate the RMS line voltage and load current during the period $t_{C\_TRIP}$. Microprocessor U1 then determines, at block 155 and using an inverse proportionality relationship such as is illustrated in FIG. 6, whether the load current exceeds an allowable value based on the line voltage. If the load current is over the allowed limit, microprocessor U1 proceeds via the yes branch to block 156, where the fault flag is set. Microprocessor U1 then returns to the main program (FIG. 7). If the load current is not over the limit, microprocessor U1 clears the fault flag at block 158, and then returns to the main program.

Figure 11:
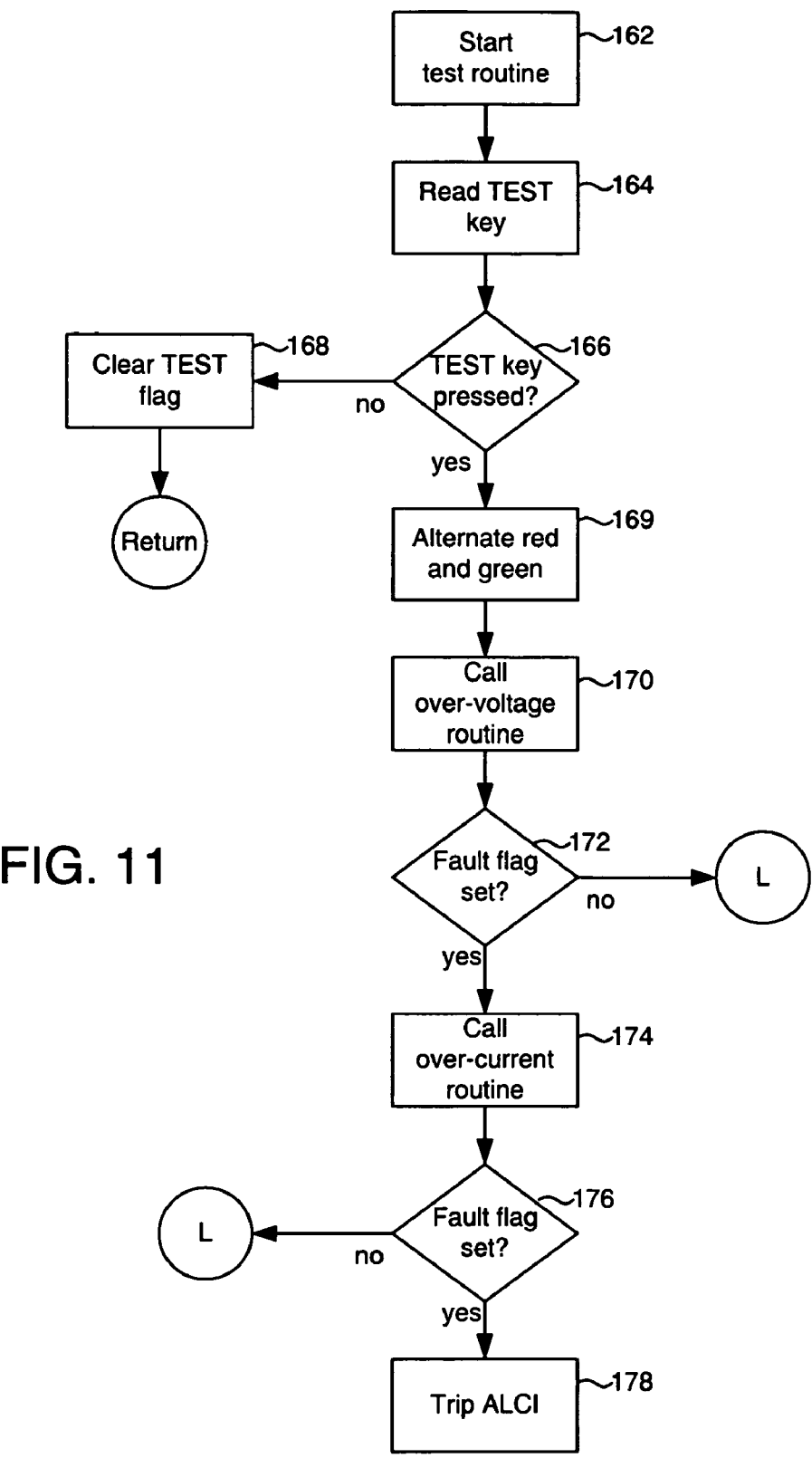

When microprocessor U1 returns to the main program, the microprocessor determines at block 114 whether the fault flag is set. If so, microprocessor U1 proceeds via the "yes" branch and off-page connector J to block 120 (FIG. 8). If the fault flag is not set, microprocessor U1 proceeds via the no branch to block 116. At block 116, microprocessor U1 calls a test routine. FIG. 11 is a flow chart showing the test routine. After commencing the test routine at block 162, microprocessor U1 proceeds to block 164 and tests the voltage at pin 4. At block 166, microprocessor U1 determines if the user has pressed the TEST key. If the voltage at pin 4 is low, the user has not pressed the TEST key, and microprocessor U1 proceeds (via the "no" branch) to clear a "test" flag at block 168. From block 168, microprocessor U1 returns to the main program (FIG. 7), where the over-voltage routine is again called (block 108).

Figure 12:
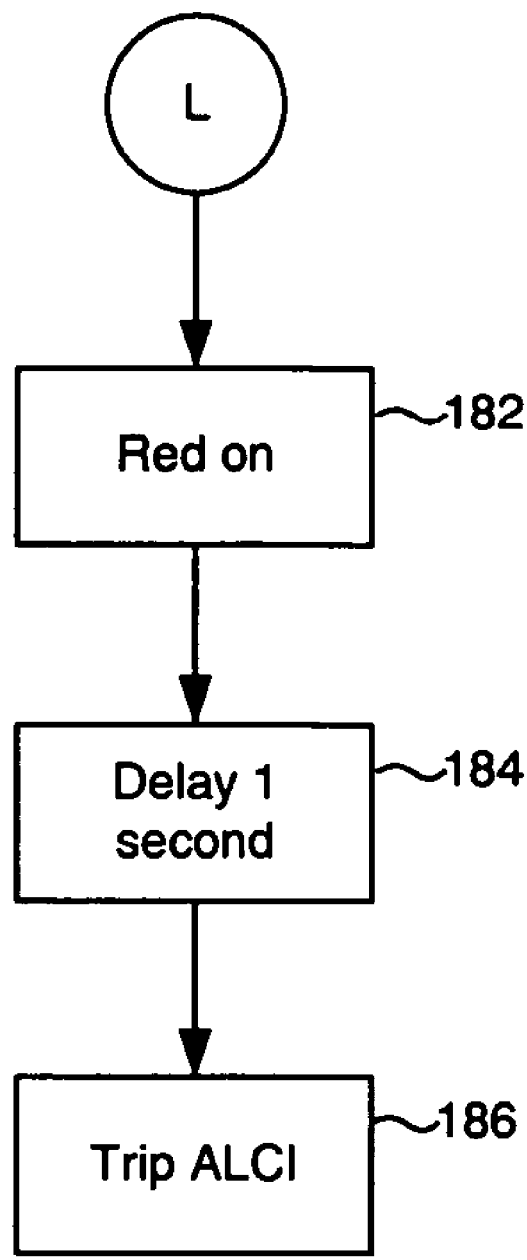
Figure 13:
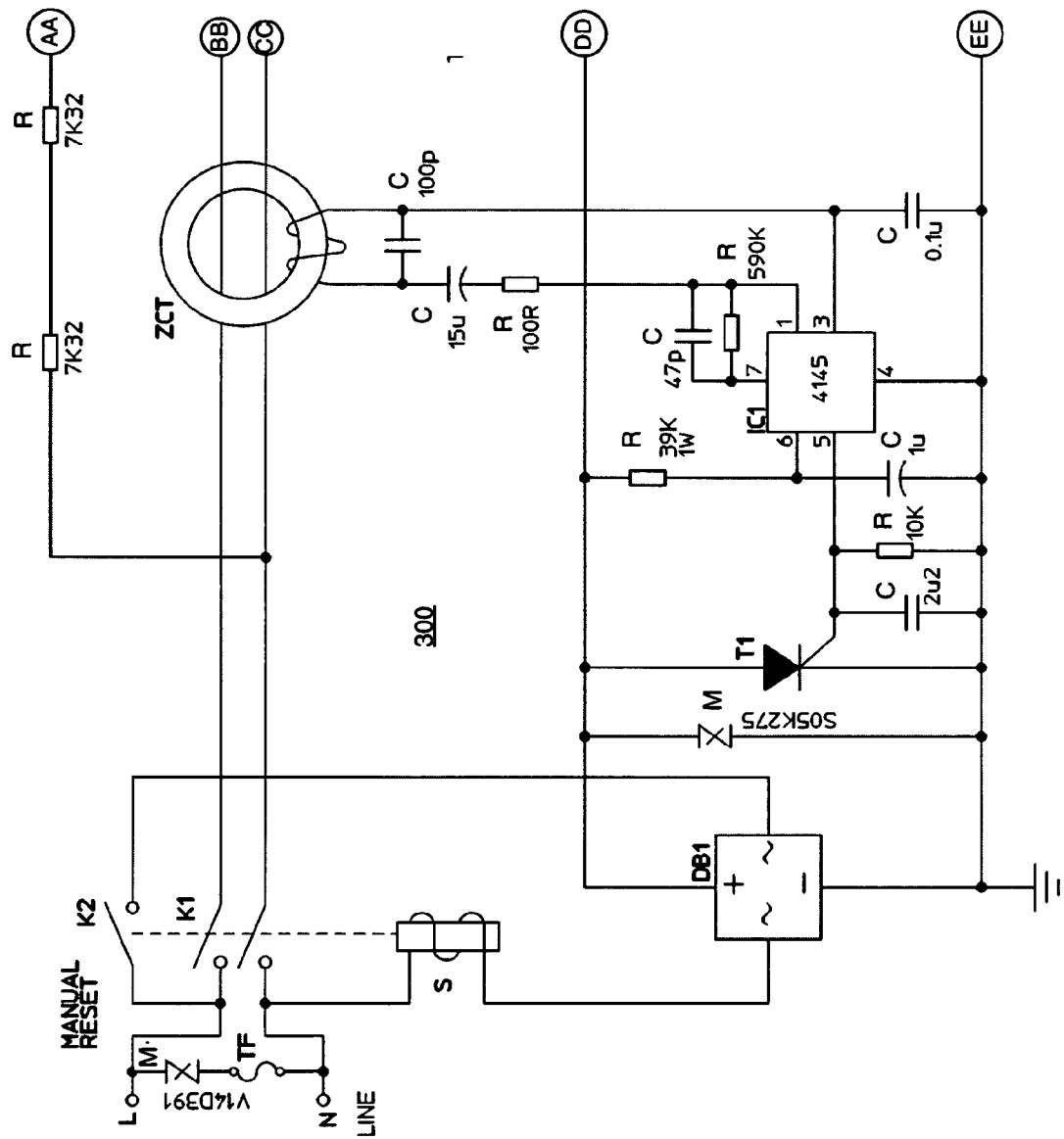
FIGS. 13-14 are a schematic diagram showing an alternative arrangement of a circuit according to at least some embodiments of the invention.
Figure 14:
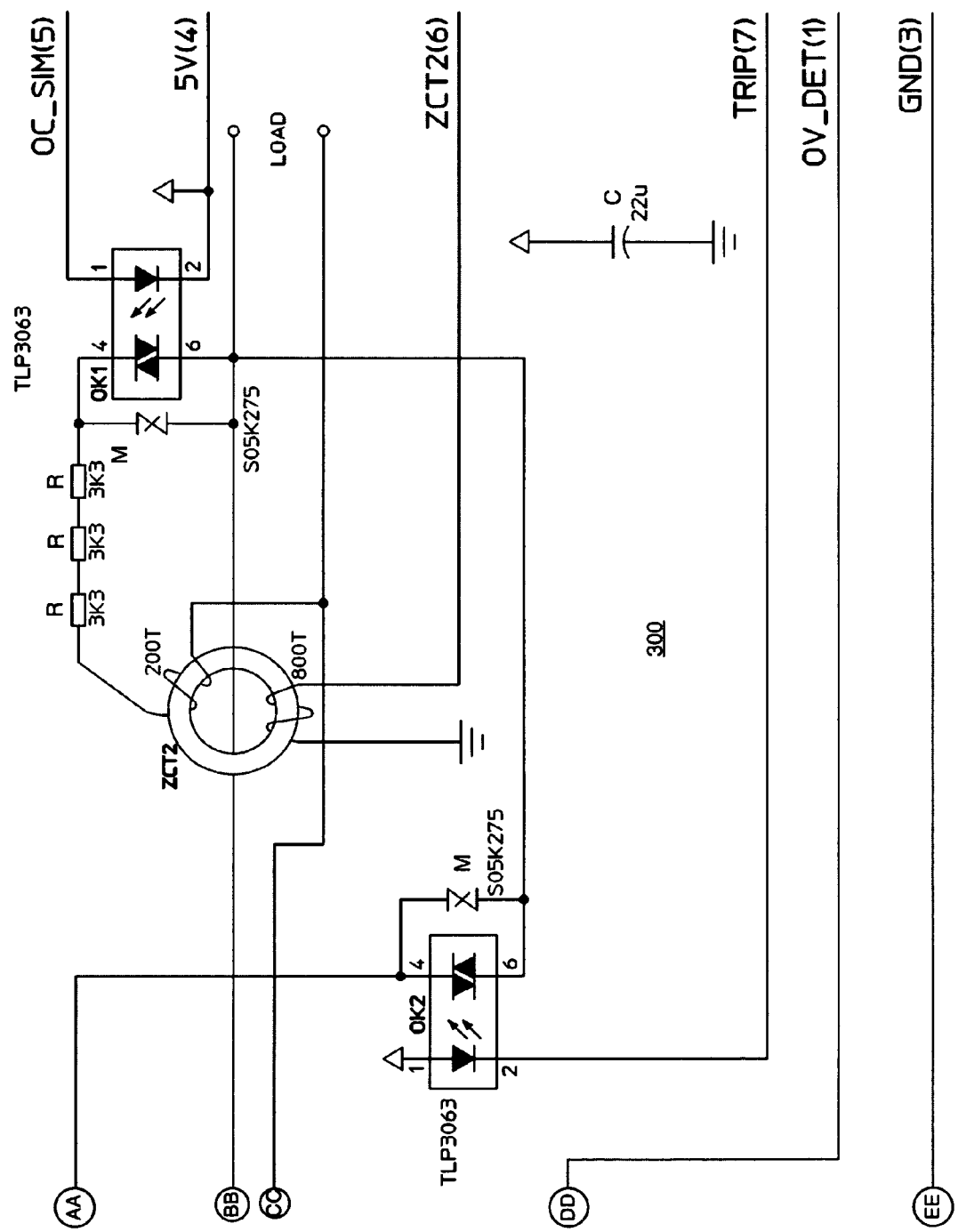
Figure 15:
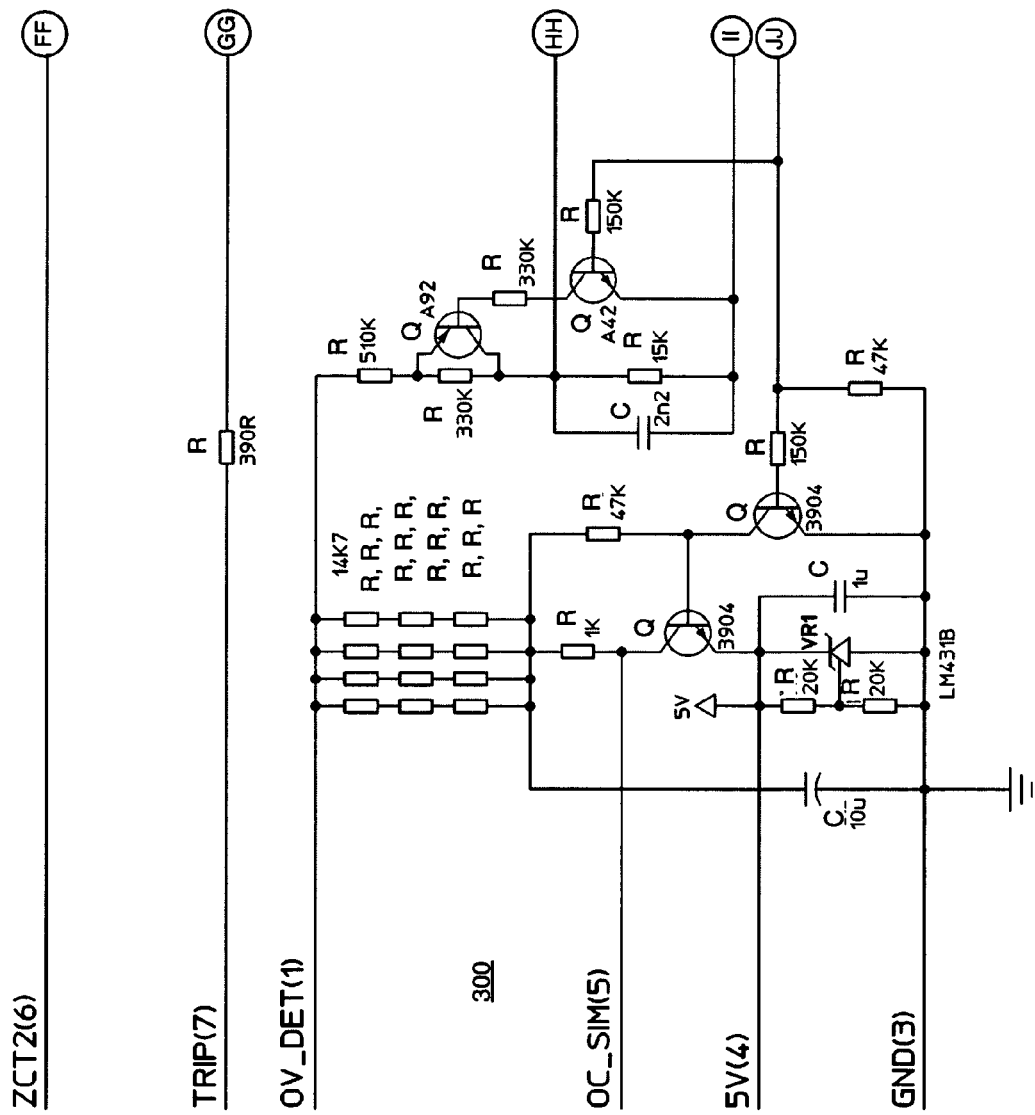

If microprocessor U1 determines at block 166 that the TEST key is pressed, the microprocessor proceeds via the "yes" branch to block 169. At block 169, microprocessor U1 begins illuminating red and green LEDs L1 and L2 in an alternating pulse sequence having a repetition rate of approximately 1 Hz. Microprocessor U1 next goes to block 170, where the over-voltage routine is called. As previously described in connection with FIGS. 1, 4 and 5, pressing the TEST key causes an increased voltage to be applied to pin 7 of microprocessor U1. Accordingly, the over-voltage routine (previously described in connection with FIG. 9), should cause the fault flag to be set. After the over-voltage routine returns to the test routine, microprocessor U1 determines at block 172 whether the fault flag is set. If not, a malfunction has occurred in circuit 10. In such a case, microprocessor proceeds, via the "no" branch and off-page connector L, to block 182 (FIG. 12). At block 182, microprocessor U1 ceases the alternating illumination of LEDs L1 and L2, and turns on red LED L1. At block 184, microprocessor U1 waits one second. In block 186, microprocessor U1 trips the ALCI by causing a current mismatch between lines 12 and 14.

Returning to FIG. 11, if the fault flag is set at block 172, microprocessor U1 proceeds to block 174. At block 174, the microprocessor calls the over-current routine, the operation of which is described above. In addition to causing an increased voltage at pin 7 of microprocessor U1, pressing the test key also illuminates the LED of optically-coupled triac U6. As previously described, this causes a voltage to be generated in the winding of sensing transformer ZCT2 measured by op amp U3, thereby increasing the voltage at pin 6 of microprocessor U1. Accordingly, the over-current routine should cause the fault flag to be set. After the over-current routine returns to the test routine, microprocessor U1 determines at block 176 whether the fault flag is set. If not, a malfunction has occurred in circuit 10. In such a case, microprocessor proceeds, via the "no" branch and off-page connector L, to block 182 (FIG. 12). If the fault flag is set, microprocessor U1 proceeds on the "yes" branch to block 178. At block 178, microprocessor U1 trips the ALCI by causing a current mismatch between lines 12 and 14. If the ALCI functions correctly, the user will hear the ALCI tripping and see the LEDS L1 and L2 turn off. In some embodiments, microprocessor U1 is further configured, in the event of a failed attempt to trip the ALCI at block 178, to stop alternately illuminating red and green LEDs L1 and L2, and to turn on red LED L1.

In some embodiments, microprocessor U1 may further be configured to automatically test the over-voltage and/or over-current portions of circuit 10. For example, microprocessor U1 could be programmed to periodically (e.g., every start-up, after 30 minutes of continuous power, etc.) execute a separate routine that only tests the over-voltage and over-current sub-circuits. In at least some embodiments, circuit 10 is also equipped with a surge protector to interrupt power in the event of a large voltage spike (e.g., because of a lightning strike). As shown in FIGS. 1 and 2, a metal oxide varistor M1 and fuse TF can be positioned across the input lines. Upon imposition of a sufficiently large voltage spike, varistor M1 allows current to flow through fuse TF and return through the other line without passing to the load appliance.

Figure 16:
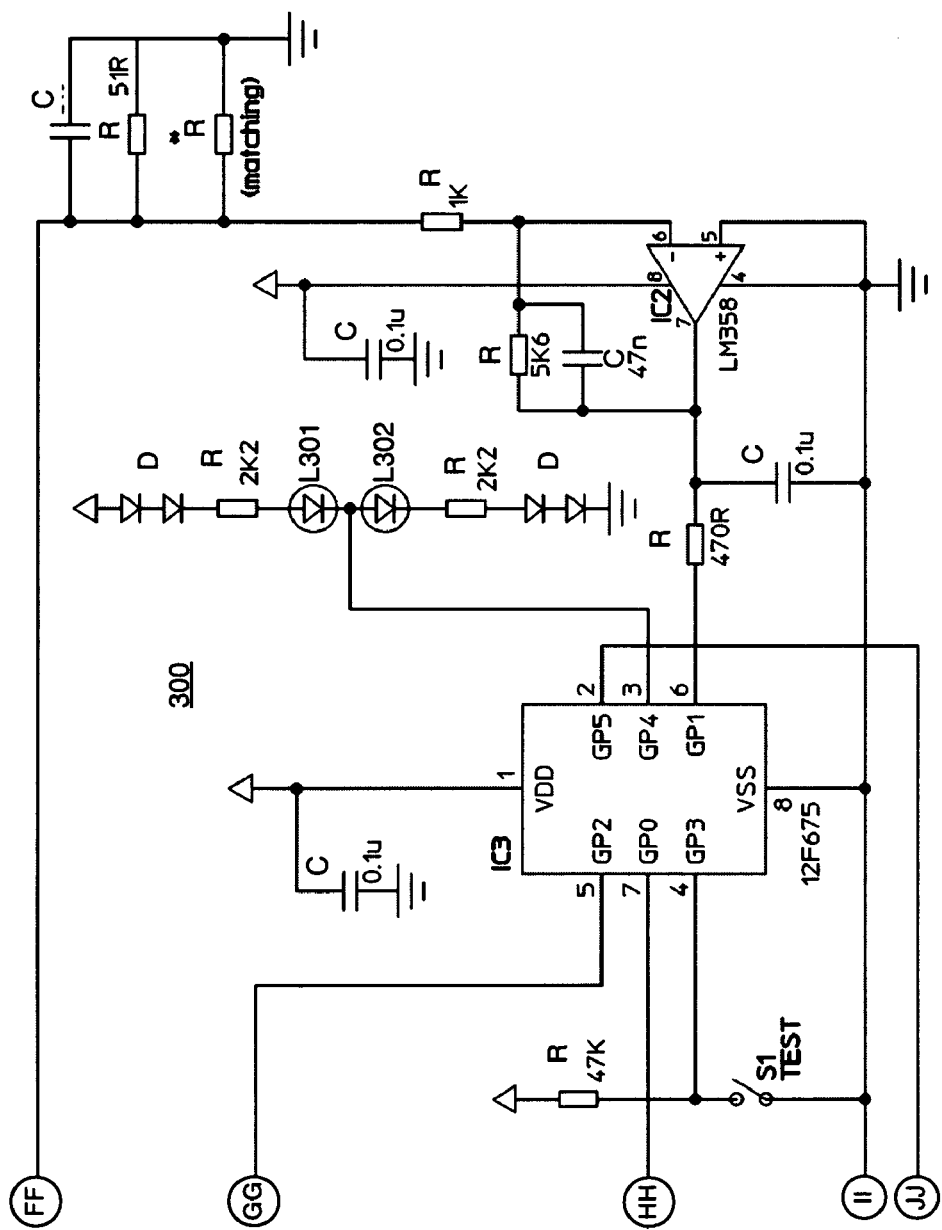
FIGS. 16-20 are a schematic diagram showing another alternative arrangement of a circuit according to at least some embodiments of the invention.

FIGS. 13-16 are a schematic diagram showing an alternative arrangement of a circuit 300 according to at least some embodiments of the invention. As with FIGS. 1-5, electrical connections between lines on separate drawings sheets are indicated by like references (e.g., "AA" and "AA", "OC_SIM(5)" and "OC_SIM(5)", etc.). Specific references have not been applied to all components in FIGS. 13-16 (e.g., many resistors are labeled "R" instead of R1, R2, etc.), but persons skilled in the art will recognize the purposes of the various components based on the respective symbols and on other information shown in the figures. Circuit 300 operates in a manner similar to that described in connection with circuit 10 (FIGS. 1-5), and any differences are readily appreciated by persons skilled in the art. As seen in FIG. 16, for example, pin 3 of microprocessor IC3 (also a PIC12F675 device available from Microchip Technology Inc.) is connected to a junction between two LEDs L301 and L302. In order to selectively activate L301 or L302, microprocessor IC3 alternately raises or lowers the voltage on pin 3. When microprocessor IC3 places pin 3 in a high impedance condition without raising the pin 3 voltage, neither LED L301 or L302 is illuminated. Pin 2 of IC3 is connected (via off-page connector JJ to connector JJ in FIG. 15) to components performing functions similar to those of the components in FIG. 5, and IC3 pin 4 is connected to the test switch. Upon detecting an increased voltage at pin 4 because of closure of the test switch, microprocessor IC3 raises the voltage on pin 2, thereby causing the pin 7 voltage to increase and activating the LED of optically coupled triac OK1. Persons skilled in the art will readily appreciate other functions that must be assigned to the various pins of microprocessor IC3 such that circuit 300 operates similar to circuit 10. Persons skilled in the art will likewise appreciate the significance of other differences between circuit 300 and circuit 10, and such differences are thus not further discussed.

FIGS. 17-20 are a schematic diagram showing yet another alternate arrangement of a circuit 500 according to at least some embodiments of the invention. As with FIGS. 1-5 and 13-16, electrical connections between lines on separate drawings sheets are indicated by like references (e.g., "AAA" and "AAA", "OC_SIM" and "OC_SIM", etc.). Specific references have not been applied to all components in FIGS. 17-20 (e.g., many resistors are labeled "R" instead of R1, R2, etc.), but persons skilled in the art will appreciate the purposes of the various components based on the respective symbols and on other information shown in the figures.

Figure 17:
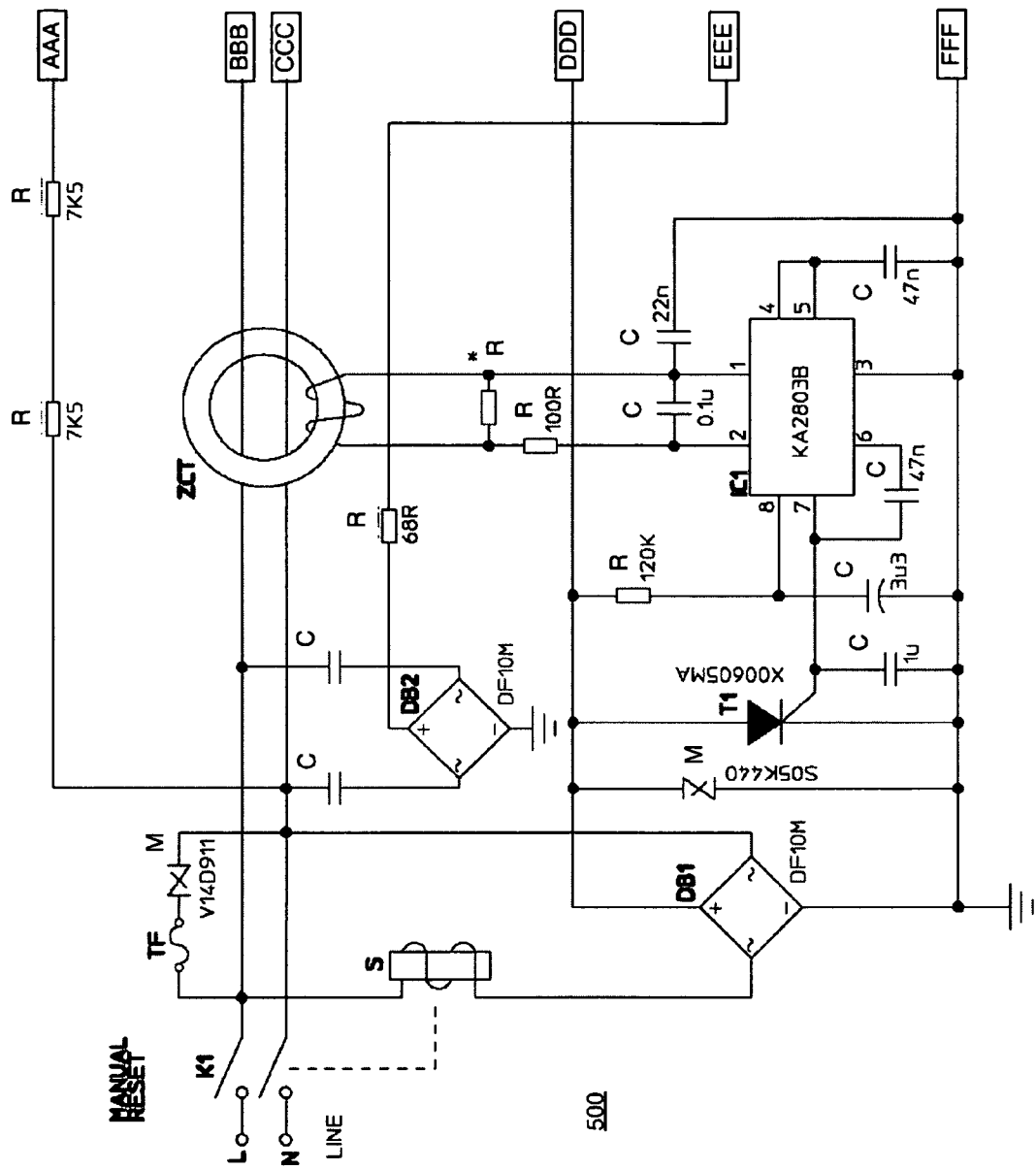
Figure 18:
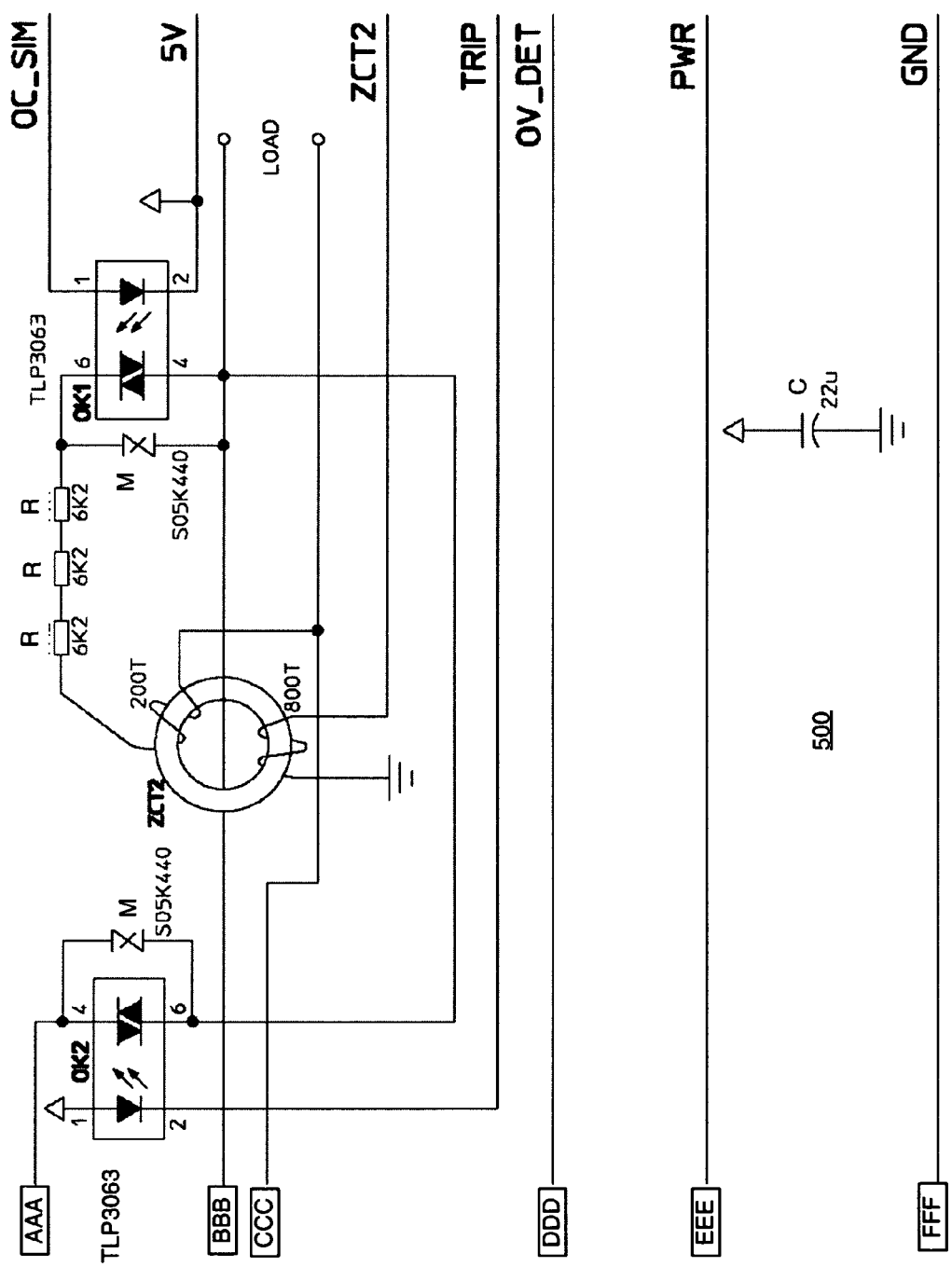
Figure 19:
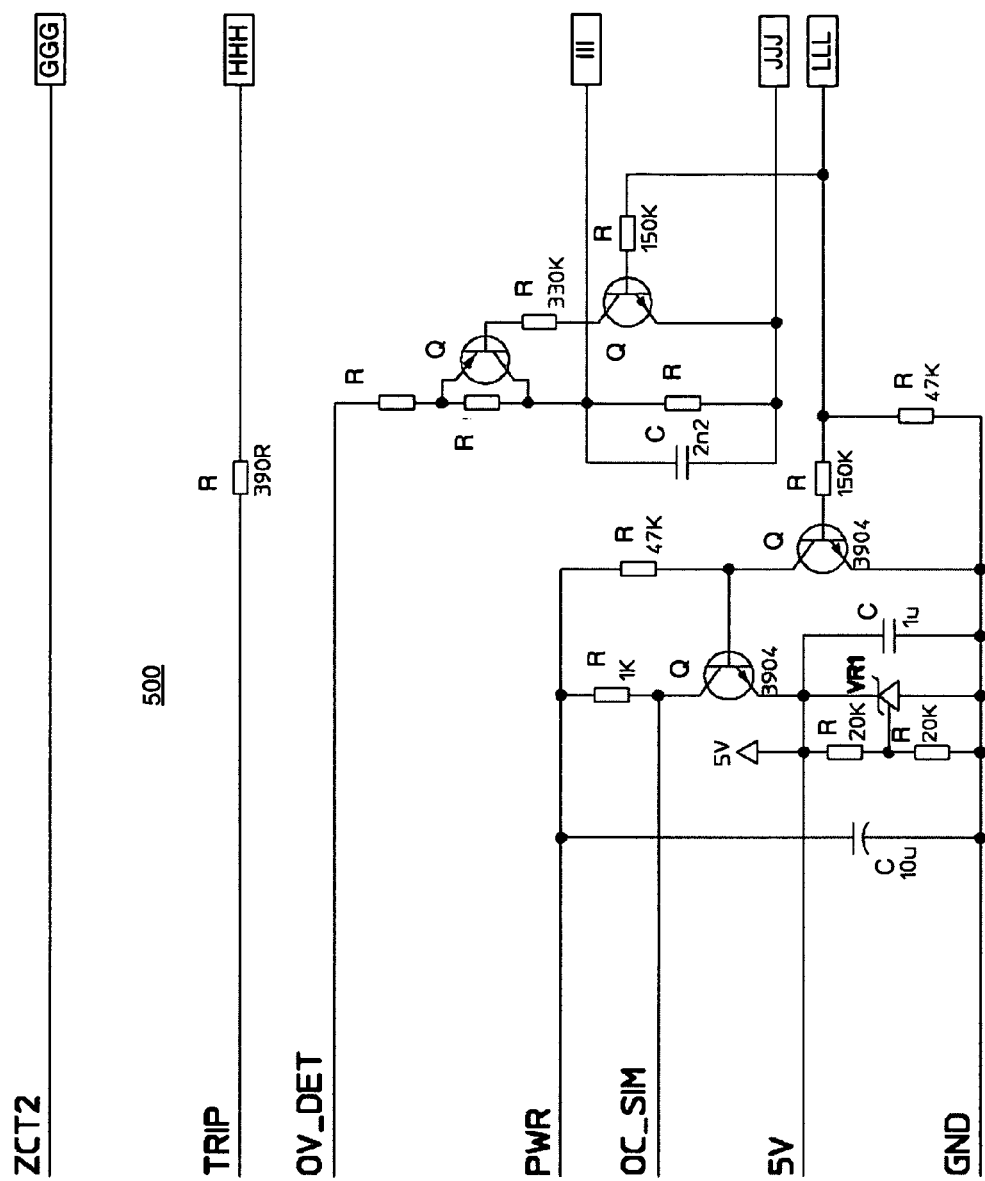
Figure 20:
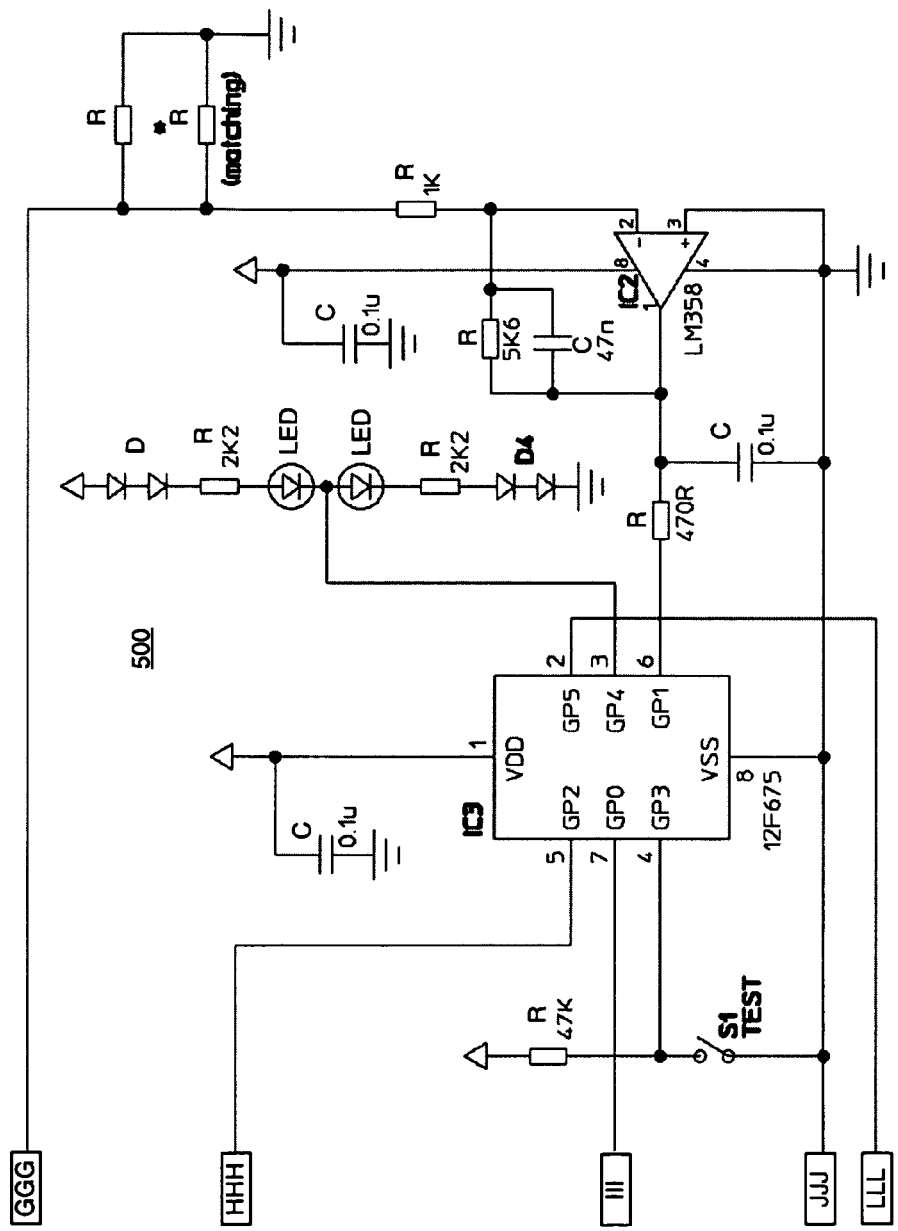

Notably, circuit 500 is intended for use in European countries having different certification requirements. Component IC 1 in FIG. 17 is an ALCI monitoring IC sold by Fairchild Semiconductor Corporation and having part number KA2803B. Circuit 500 operates similar to circuits 10 and 300, but instead having the operating parameters set forth in Tables 3 and 4.

TABLE 3

| | |
|---|---|
| Operating Input Voltage | 180-264 $V_{RMS}$, 47-53 Hz |
| Operating Load Current | 0.85 $A_{RMS}$ |
| $V_{TRIP}$ | 270-310 $V_{RMS}$ for $t_{V\_TRIP}$ |
| $t_{V\_TRIP}$ | 525 ms < $t_{V\_TRIP}$ < 675 ms |
| $t_{A\_TRIP}$ | 100 ms < $t_{A\_TRIP}$ < 250 ms |
| first brown-out threshold (block 132, FIG. 9) | <~151 $V_{RMS}$ for over 200 ms |
| second brown-out threshold (block 134, FIG. 9) | <161 $V_{RMS}$ for over 150 ms |

TABLE 4

| $A_{TRIP}$, $A_{RMS}$ (+/− tolerance, $mA_{RMS}$) | Input Voltage, $V_{RMS}$ |
|---|---|
| 750 $mA_{RMS}$ (+/−25 $mA_{RMS}$) | 180 $V_{RMS}$ |
| 665 $mA_{RMS}$ (+/−25 $mA_{RMS}$) | 220 $V_{RMS}$ |
| 625 $mA_{RMS}$ (+/−25 $mA_{RMS}$) | 220 $V_{RMS}$ |
| 585 $mA_{RMS}$ (+/−25 $mA_{RMS}$) | 264 $V_{RMS}$ |

Although specific examples of carrying out the invention have been described, those skilled in the art will appreciate that there are numerous variations and permutations of the above described systems and techniques that fall within the spirit and scope of the invention as set forth in the appended claims. In at least some embodiments, a combined ALCI, over-voltage interrupter and over-current interrupter circuit is placed on a printed circuit board sized to fit within a housing for a wall plug. Although certain embodiments of the invention are implemented using a programmable microprocessor as a component of the circuit, other embodiments do not include a microprocessor. For example, the over-voltage detection and/or over-current detection sub-circuits can also be implemented using one or more comparators and state machine circuitry. Moreover, algorithms other than those described above could be used, as could other operating parameters (e.g., different values for $V_{TRIP}$, $I_{TRIP}$, $t_{A\_TRIP}$, $t_{V\_TRIP}$, etc.) and other circuit components. These and other modifications are within the scope of the invention as defined by the attached claims.

The invention claimed is:

1. A circuit for interrupting power to an appliance, comprising:
   a current detector providing an imbalance signal when current through first and second power supply lines is unbalanced by more than a predetermined amount;
   an interruption switch for interrupting current flow through at least one of the first and second supply lines;
   a ground fault detection sub-circuit configured to open the interruption switch upon receipt of the imbalance signal;
   a fault-inducing switch connecting the first and second supply lines and causing a current imbalance between the first and second supply lines when closed;
   an over-voltage detection sub-circuit configured to receive a signal indicative of voltage supplied to the appliance, and further configured to close the fault-inducing switch when the supplied voltage exceeds a voltage threshold $V_{TRIP}$;
   at least one TEST switch, the closure of which causes the over-voltage detection sub-circuit to receive a signal indicative of a supplied voltage exceeding $V_{TRIP}$; and
   at least one externally visible light-emitting component, and wherein the over-voltage detection sub-circuit is further configured:
      to determine, upon closure of the TEST switch, whether a signal corresponding to a supplied voltage exceeding $V_{TRIP}$ has been detected,
      to close the fault-inducing switch upon determining that a signal corresponding to a supplied voltage exceeding $V_{TRIP}$ has been detected, and
      to activate the at least one light-emitting component so as to indicate a malfunction upon determining that a signal corresponding to a supplied voltage exceeding $V_{TRIP}$ has not been detected.

2. The circuit of claim 1, further comprising:
   a surge protector sub-circuit operably positioned across said first and second power supply lines.

3. The circuit of claim 1, further comprising:
   a microprocessor configured to automatically test the over-voltage sub-circuit and to indicate a malfunction when the test determines that there is a malfunction.

4. A circuit for interrupting power to an appliance, comprising:
   a current detector providing an imbalance signal when current through first and second power supply lines is unbalanced by more than a predetermined amount;
   at least one interruption switch for interrupting current flow through at least one of the first and second supply lines;
   a ground fault detection sub-circuit configured to open the at least one interruption switch upon receipt of the imbalance signal;
   a fault-inducing switch connecting the first and second supply lines and causing a current imbalance between the first and second supply lines when closed; and
   an over-current detection sub-circuit configured to receive a signal indicative of current supplied to the appliance, and further configured to close the fault-inducing switch when the supplied current exceeds a current threshold $A_{TRIP}$;
   wherein the over-current detection sub-circuit is also configured to receive a signal indicative of voltage supplied to the appliance, and wherein $A_{TRIP}$ has a value that varies based on the supplied voltage.

5. The circuit of claim 4, wherein $A_{TRIP}$ is inversely proportional to the supplied voltage over a range of supplied voltage values.

6. The circuit of claim 4, further comprising:
a surge protector sub-circuit operably positioned across said first and second power supply lines.

7. The circuit of claim 4, further comprising:
a microprocessor configured to automatically test the over-current sub-circuit and to indicate a malfunction when the test determines that there is a malfunction.

8. A circuit for interrupting power to an appliance, comprising:
a current detector providing an imbalance signal when current through first and second power supply lines is unbalanced by more than a predetermined amount;
at least one interruption switch for interrupting current flow through at least one of the first and second supply lines;
a ground fault detection sub-circuit configured to open the at least one interruption switch upon receipt of the imbalance signal;
a fault-inducing switch connecting the first and second supply lines and causing a current imbalance between the first and second supply lines when closed; and
an over-current detection sub-circuit configured to receive a signal indicative of current supplied to the appliance, and further configured to close the fault-inducing switch when the supplied current exceeds a current threshold $A_{TRIP}$;
wherein the over-current detection sub-circuit is further configured to close the fault-inducing switch when the supplied current exceeds a current threshold $A_{TRIP}$ for a period of time $t_{A\_TRIP}$;
wherein the over-current detection sub-circuit is also configured to receive a signal indicative of voltage supplied to the appliance, and
wherein $A_{TRIP}$ has a value that varies based on the supplied voltage.

9. The circuit of claim 8, wherein $t_{A\text{-}TRIP}$ exceeds 100 milliseconds.

10. The circuit of claim 8, wherein $t_{A\text{-}TRIP}$ exceeds 150 milliseconds.

11. The circuit of claim 8, wherein $t_{A\text{-}TRIP}$ exceeds 200 milliseconds.

12. The circuit of claim 8, wherein $A_{TRIP}$ is inversely proportional to the supplied voltage over a range of supplied voltage values.

13. The circuit of claim 8, wherein the over-current detection sub-circuit comprises a microprocessor configured to determined whether the supplied current has exceeded $A_{TRIP}$ for a period of time $t_{A\text{-}Trip}$, and to close the fault-inducing switch upon making said determination.

14. The circuit of claim 8, further comprising:
a surge protector sub-circuit operably positioned across said fist and second power supply lines.

15. The circuit of claim 8, further comprising:
a microprocessor configured to automatically test the over-current sub-circuit and to indicate a malfunction when the test determines that there is a malfunction.

16. A circuit for interrupting power to an appliance, comprising:
a current detector providing an imbalance signal when current though first and second power supply lines is unbalanced by more than a predetermined amount;
at least one interruption switch for interrupting current flow through at least one of the first and second supply lines;
a ground fault detection sub-circuit configured to open the at least one interruption switch upon receipt of the imbalance signal;
a fault-inducing switch connecting the first and second supply lines and causing a current imbalance between the first and second supply lines when closed; and
an over-current detection sub-circuit configured to receive a signal indicative of current supplied to the appliance, and further configured to close the fault-inducing switch when the supplied current exceeds a current threshold $A_{TRIP}$;
at least one TEST switch, the closure of which causes the over-current detection sub-circuit to receive a signal indicative of supplied current exceeding $A_{TRIP}$; and
at least one externally-visible light-emitting component, and wherein the over-current detection sub-circuit is further configured:
to determine, upon closure of the TEST switch, whether a signal corresponding to a supplied current exceeding $A_{TRIP}$ has been detected,
to close the fault-inducing switch upon determining that a signal corresponding to a supplied current exceeding $A_{TRIP}$ has been detected, and
to activate the at least one light-emitting component so as to indicate a malfunction upon determining that a signal corresponding to a supplied current exceeding $A_{TRIP}$ has not been detected.

17. The circuit of claim 16, further comprising:
a surge protector sub-circuit operably positioned across said first and second power supply lines.

18. The circuit of claim 16, further comprising:
a microprocessor configured to automatically test the over-current sub-circuit and to indicate a malfunction when the test determines that there is a malfunction.

19. A circuit for interrupting power to an appliance, comprising:
a current detector providing an imbalance signal when current through first and second power supply lines is unbalanced by more than a predetermined amount;
at least one interruption switch for interrupting current flow through at least one of the first and second supply lines;
a ground fault detection sub-circuit configured to open the at least one interruption switch upon receipt of the imbalance signal;
a fault-inducing switch connecting the first and second supply lines and causing a current imbalance between the first and second supply lines when closed; and
an over-current detection sub-circuit configured to receive a signal indicative of current supplied to the appliance, and further configured to close the fault-inducing switch when the supplied current exceeds a current threshold $A_{TRIP}$;
an over-voltage detection subcircuit configured to receive a signal indicative of voltage supplied to the appliance, and further configured to close the fault-inducing switch when the supplied voltage exceeds a voltage threshold $V_{TRIP}$;
wherein the over-current detection sub-circuit is also configured to receive a signal indicative of voltage supplied to the appliance, and
wherein $A_{TRIP}$ has a value that varies based on the supplied voltage.

20. The circuit of claim 19, wherein the over-voltage detection sub-circuit is further configured to close the fault-inducing switch when the supplied voltage exceeds $V_{TRIP}$ for a period of time $t_{V\text{-}TRIP}$.

21. The circuit of claim 19, wherein $A_{TRIP}$ is inversely proportional to the supplied voltage over a range of supplied voltage values.

22. The circuit of claim 19, further comprising:
a surge protector sub-circuit operably positioned across said first and second power supply lines.

23. The circuit of claim 19, further comprising:
a microprocessor configured to automatically test the over-voltage and over-current sub-circuits and to indicate a malfunction when the test determines that there is a malfunction.

24. A circuit for interrupting power to an appliance, comprising:
a current detector providing an imbalance signal when current through first and second power supply lines is unbalanced by more than a predetermined amount;
at least one interruption switch for interrupting current flow through at least one of the first and second supply lines;
a ground fault detection sub-circuit configured to open the at least one interruption switch upon receipt of the imbalance signal;
a fault-inducing switch connecting the first and second supply lines and causing a current imbalance between the first and second supply lines when closed; and
an over-current detection sub-circuit configured to receive a signal indicative of current supplied to the appliance, and further configured to close the fault-inducing switch when the supplied current exceeds a current threshold $A_{TRIP}$;
said circuit further comprising an over-voltage detection subcircuit configured to receive a signal indicative of voltage supplied to the appliance, and further configured to close the fault-inducing switch when the supplied voltage exceeds a voltage threshold $V_{TRIP}$;
at least one TEST switch, the closure of which causes the over-voltage detection sub-circuit to receive a signal indicative of a supplied voltage exceeding $V_{TRIP}$ and the over-current detection sub-circuit to receive a signal indicative of a supplied current exceeding $A_{TRIP}$; and
at least one externally-visible light-emitting component, and wherein the over-voltage detection and over-current detection sub-circuits are further configured:
to determine, upon closure of the TEST switch, whether signals indicative of a supplied voltage exceeding $V_{TRIP}$ and a supplied current exceeding $A_{TRIP}$ have been detected,
to close the fault-inducing switch upon determining that signals indicative of a supplied voltage exceeding $V_{TRIP}$ and a supplied current exceeding $A_{TRIP}$ have been detected, and
to activate the at least one light-emitting component so as to indicate a malfunction upon determining that a signal indicative of a supplied voltage exceeding $V_{TRIP}$ has not been detected or that a signal indicative of a supplied current exceeding $A_{TRIP}$ has not been detected.

25. The circuit of claim 24, further comprising:
a surge protector sub-circuit operably positioned across said first and second power supply lines.

26. The circuit of claim 24, further comprising:
a microprocessor configured to automatically test the over-voltage and over-current sub-circuits and to indicate a malfunction when the test determines that there is a malfunction.

27. A circuit for interrupting power to an appliance, comprising:
an interruption switch for interrupting current flow through at least one of first and second supply lines supplying power to an appliance;
an over-voltage detection sub-circuit configured to receive a signal indicative of voltage supplied to the appliance, and further configured to open the interruption switch when the supplied voltage exceeds a voltage threshold $V_{TRIP}$ for a period of time $t_{V\_TRIP}$; and
an over-current detection sub-circuit configured to receive a signal indicative of current supplied to the appliance, and further configured to open the interruption switch when the supplied current exceeds a current threshold $A_{TRIP}$ for a period of time $t_{A\_TRIP}$;
wherein the over-current detection sub-circuit is also configured to receive a signal indicative of voltage supplied to the appliance, and wherein $A_{TRIP}$ has a value that varies based on the supplied voltage.

28. The circuit of claim 27, wherein $A_{TRIP}$ is inversely proportional to the supplied voltage over a range of supplied voltage values.

29. The circuit of claim 27, wherein:
the over-voltage detection sub-circuit comprises a microprocessor configured to determine whether the supplied voltage has exceeded $V_{TRIP}$ for $t_{V\_TRIP}$, and to open the interruption switch upon making said determination, and
the over-current detection sub-circuit comprises a microprocessor configured to determine whether the supplied current has exceeded $A_{TRIP}$ for $t_{A\_TRIP}$, and to open the interruption switch upon making said determination.

30. The circuit of claim 27, further comprising:
a surge protector sub-circuit operably positioned across said first and second supply lines supplying power to the appliance.

31. The microprocessor of claim 27, wherein the microprocessor is further configured to automatically test the over-voltage and over-current sub-circuits and to indicate a malfunction when the test determines that there is a malfunction.

32. A circuit for interrupting power to an appliance, comprising:
an interruption switch for interrupting current flow through at least one of first and second supply lines supplying power to an appliance;
an over-voltage detection sub-circuit configured to receive a signal indicative of voltage supplied to the appliance, and further configured to open the interruption switch when the supplied voltage exceeds a voltage threshold $V_{TRIP}$ for a period of time $t_{V\_TRIP}$;
an over-current detection sub-circuit configured to receive a signal indicative of current supplied to the appliance, and further configured to open the interruption switch when the supplied current exceeds a current threshold $A_{TRIP}$ for a period of time $t_{A\_TRIP}$;
at least one TEST switch, the closure of which causes the over-voltage detection sub-circuit to receive a signal indicative of a supplied voltage exceeding $V_{TRIP}$ and the over-current detection sub-circuit to receive a signal indicative of a supplied current exceeding $A_{TRIP}$; and
at least one externally-visible light-emitting component, and wherein the over-voltage detection and over-current detection sub-circuits are further configured:

to determine, upon closure of the TEST switch, whether signals indicative of a supplied voltage exceeding $V_{TRIP}$ and a supplied current exceeding $A_{TRIP}$ have been detected, to open the interruption switch upon determining that signals indicative of a supplied voltage exceeding $V_{TRIP}$ and a supplied current exceeding $A_{TRIP}$ have been detected, and to activate the at least one light-emitting component so as to indicate a malfunction upon determining that a signal indicative of a supplied voltage exceeding $V_{TRIP}$ has not been detected or that a signal indicative of a supplied current exceeding $A_{TRIP}$ has not been detected.

33. The circuit of claim 32, further comprising:

a surge protector sub-circuit operably positioned across said first and second supply lines supplying power to the appliance.

34. The circuit of claim 32, further comprising:

a microprocessor configured to automatically test the over-voltage and over-current sub-circuits and to indicate a malfunction when the test determines that there is a malfunction.

\* \* \* \* \*